(12) United States Patent
Vitic et al.

(10) Patent No.: US 11,650,475 B2
(45) Date of Patent: May 16, 2023

(54) APPARATUS AND METHOD FOR DRIVING AN OPTICAL MODULATOR WITH INDEPENDENT MODULATOR ARM BIAS

(71) Applicant: Ciena Corporation, Hanover, MD (US)

(72) Inventors: Michael Vitic, Chelsea (CA);
Christopher Edgar Falt, Nepean (CA);
Alexandre Delisle-Simard, Quebec (CA); Michel Poulin, Quebec (CA)

(73) Assignee: Ciena Corporation, Hanover, MD (US)

( * ) Notice: Subject to any disclaimer, the term of this patent is extended or adjusted under 35 U.S.C. 154(b) by 262 days.

(21) Appl. No.: 17/141,672

(22) Filed: Jan. 5, 2021

(65) Prior Publication Data

US 2021/0124234 A1    Apr. 29, 2021

Related U.S. Application Data

(63) Continuation-in-part of application No. 16/111,423, filed on Aug. 24, 2018, now Pat. No. 10,908,474.

(51) Int. Cl.
*G02F 1/225*    (2006.01)
*G02F 1/025*    (2006.01)
*G02F 1/21*    (2006.01)

(52) U.S. Cl.
CPC ............ *G02F 1/2255* (2013.01); *G02F 1/025* (2013.01); *G02F 1/212* (2021.01)

(58) Field of Classification Search
CPC ......... G02F 1/2255; G02F 1/212; G02F 1/025
See application file for complete search history.

(56) References Cited

U.S. PATENT DOCUMENTS

| | | |
|---|---|---|
| 9,841,618 B1 | 12/2017 | Poulin et al. |
| 2005/0254743 A1 | 11/2005 | Akiyama et al. |
| 2011/0074487 A1 | 3/2011 | Behnia |
| 2018/0356654 A1* | 12/2018 | Tatsumi ........... H03K 19/01812 |
| 2020/0064707 A1 | 2/2020 | Vitic et al. |

OTHER PUBLICATIONS

A. Zandieh, et al., "57.5GHz bandwidth 4.8Vpp swing linear modulator driver for 64GBaud m-PAM systems," 2017 IEEE MTT-S International Microwave Symposium (IMS), Honololu, HI, 2017, pp. 130-133.

* cited by examiner

*Primary Examiner* — Sung H Pak
*Assistant Examiner* — Hoang Q Tran
(74) *Attorney, Agent, or Firm* — Young Basile Hanlon & MacFarlane, P.C.

(57) ABSTRACT

Driving an optical modulator is described. A control circuit generates first and second input voltages based on a target phase modulation between first and second optical waveguide arms of the optical modulator. An offset control circuit generates first and second offset signals. A linear modulator driver receives the first and second offset signals, generates a first output voltage for biasing the first optical waveguide arm using the first offset signal, and generates a second output voltage for biasing the second optical waveguide arm using the second offset signal. Feedback circuitry can feed the first and second output voltages to the offset control circuit, which can generate the first and second offset signals using the first and second output voltages. The output voltages bias the waveguide arms so the optical modulator operates close to the target phase modulation, even in the presence of manufacturing errors.

20 Claims, 17 Drawing Sheets

# APPARATUS AND METHOD FOR DRIVING AN OPTICAL MODULATOR WITH INDEPENDENT MODULATOR ARM BIAS

CROSS-REFERENCE TO RELATED APPLICATION

This application is a continuation-in-part of U.S. patent application Ser. No. 16/111,423, filed Aug. 24, 2018, the entire content of which is incorporated herein in its entirety by reference.

TECHNICAL FIELD

This disclosure relates in general to driving an optical modulator, such as a Mach-Zehnder modulator, and more particularly to driving an optical modulator with independent modulator arm bias that, among other benefits, mitigates modulator fabrication errors.

BACKGROUND

In silicon, phase modulation is based on a dependency of a refractive index on free carrier density. Accordingly, by building a pn junction within an optical waveguide, and by applying a time-varying reverse voltage to the pn junction, the depletion region of the junction can be modulated. This modulates the free carrier density, hence modulating the refractive index.

In a series push-pull (SPP) configuration of an optical modulator, two pn junctions, each located in each of a pair of optical waveguides are connected back-to-back, with either the n-sides or the p-sides in electrical contact. This configuration is preferred for a low-chirp operation because it provides that, in an ideal case, each of the interferometer arms produces an equal but opposite amount of phase shift. In this ideal case, the $V\pi$ of each arm (i.e., the amount of voltage required to produce a phase change of $\pi$) is the same.

FIG. 1 illustrates an optical (e.g., a Mach-Zehnder) modulator 100 in the SPP configuration where the diodes 102 each comprise a p-doped region 104 and an n-doped region 106 forming a pn junction and are connected by their p-doped regions 104 in a nppn configuration between respective electrodes 107. For high-bandwidth operation, the pn junctions are generally used in depletion mode by applying a reverse (or negative) bias voltage Vb 108 to the point 110 connecting the diodes 102 back-to-back in series. One important requirement of the modulator 100 is that the modulator arms 112 and 114 provide very similar phase modulation efficiency. Arm dissimilarity causes imbalance of the phase modulation, which in turn creates a phase variation of the optical carrier (e.g., chirp) at the output 116 of the modulator 100.

Arm dissimilarity can be illustrated with reference to FIG. 2. Dopants of p and n types are implanted at locations defined by lithographic masks aligned over already-defined optical waveguides 202. This alignment, performed using stepper lithography or the like, has an accuracy of about 50 nm, while the optical waveguides 202 have a width of about 400 to 500 nm. As compared to the width of the waveguides 202, an alignment error is not negligible and may therefore cause a significant variation in modulation efficiency from device to device, even on the same wafer.

The top of FIG. 2 shows a pair of back-to-back pn junctions 204 of a SPP configuration of an optical modulator in a nppn configuration, such as the optical modulator 100, where the lithographic masks are well aligned during manufacture. In this example, each pn junction 204 (e.g., between a respective p-doped region 104 and n-doped region 106 of a diode 102) is located coincident with the center of each optical waveguide 202 of a modulator arm, such as modulator arms 112 and 114. In each modulator arm, the modulation of the depletion width of the pn junction 204 affects a portion of the optical mode overlapping with the pn junction 204, which will be, in this case, the same for each optical waveguide 202.

In contrast, the bottom of FIG. 2 shows the pair of back-to-back pn junctions 204 of a SPP configuration of an optical modulator in the nppn configuration, such as the optical modulator 100, when the lithographic masks are misaligned during manufacture with respect to their ideal or correct position (i.e., the position defined by design). For simplicity, the same misalignment error or offset M for the n and p masks has been illustrated such that the interface of the pn junctions 204 are collectively shifted. This offset M of the pn junctions 204 leads to the optical mode in each optical waveguide 202 interacting with a larger portion of p-doped material on the waveguide 202 at the modulator arm 112 (e.g., the p-doped region 104 is larger) and with a larger portion of n-doped material on the waveguide 202 at the modulator arm 114 (e.g., the n-doped region 106 is larger). As the index variation associated with the modulation of the p and n-doped material is different, the modulation efficiency for the two modulator arms 112 and 114 will also differ, causing modulation imbalance. Stated differently, misalignment of lithographic masks employed to wafer level manufacture of the p and n-doped regions 104 and 106 with regards to the optical waveguides 202 can induce an imbalance in the modulation efficiency of the arms 112 and 114 of the optical modulator 100. The resulting chirp in the output 116 is an undesirable result of the imbalance.

SUMMARY

Independent modulator arm bias, when applied to an optical modulator, can mitigate fabrication errors and the like that can otherwise reduce the quality and efficiency of the operation of the optical modulator.

In an implementation of an apparatus described herein, the apparatus can include an optical modulator control circuit configured to generate a first input voltage and a second input voltage, the first input voltage and the second input voltage determined to produce a target phase modulation between a first optical waveguide arm and a second optical waveguide arm of an optical modulator, an offset control circuit configured to generate a first offset signal and a second offset signal based on the first input voltage and the second input voltage, and a linear modulator driver. The linear modulator driver is configured to receive the first offset signal and the second offset signal, generate, using the first offset signal, a first output voltage for biasing the first optical waveguide arm, and generate, using the second offset signal, a second output voltage for biasing the second optical waveguide arm, wherein at least one of the first output voltage is different from the first input voltage or the second output voltage is different from the second input voltage.

In another implementation of an apparatus described herein, the apparatus can include an optical modulator control circuit configured to generate a first input voltage and a second input voltage, the first input voltage and the second input voltage determined to produce a target phase modulation between a first optical waveguide arm and a second optical waveguide arm of an optical modulator, an offset control circuit configured to generate a first offset current and a second offset current, and a linear modulator driver. The linear modulator driver is configured to receive the first input voltage, the second input voltage, the first offset current, and the second offset current, and to generate a first output voltage for biasing the first optical waveguide arm by modifying the first input voltage using the first offset current and to generate a second output voltage for biasing the second optical waveguide arm by modifying the second input voltage using the second offset current, wherein at least one of the first output voltage is different from the first input voltage or the second output voltage is different from the second input voltage.

An implementation of a method described herein, the method includes receiving, from an optical modulator control circuit, a first input voltage and a second input voltage, wherein the first input voltage and the second input voltage are determined to produce a target phase modulation between a first optical waveguide arm and a second optical waveguide arm of an optical modulator, generating, using an offset control circuit, a first offset signal and a second offset signal based on the first input voltage and the second input voltage, receiving, at a linear modulator driver, the first offset signal and the second offset signal, and generating, using the linear modulator driver, a first output voltage for biasing the first optical waveguide arm using the first offset signal, and a second output voltage for biasing the second optical waveguide arm using the second offset signal, wherein at least one of the first output voltage is different from the first input voltage and the second output voltage is different from the second input voltage.

The implementations herein may be used with various optical modulators, including in Mach-Zehnder optical modulators and the like used in a series push-pull configuration, for example, and to Mach-Zehnder optical modulator and the like made using silicon-on-insulator wafers (i.e., silicon photonics), as well as InP, $LiNbO_3$, polymer, and organic-hybrid modulators and the like.

Details of these and other implementations of the teachings herein are described below with reference to the drawings.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 2:
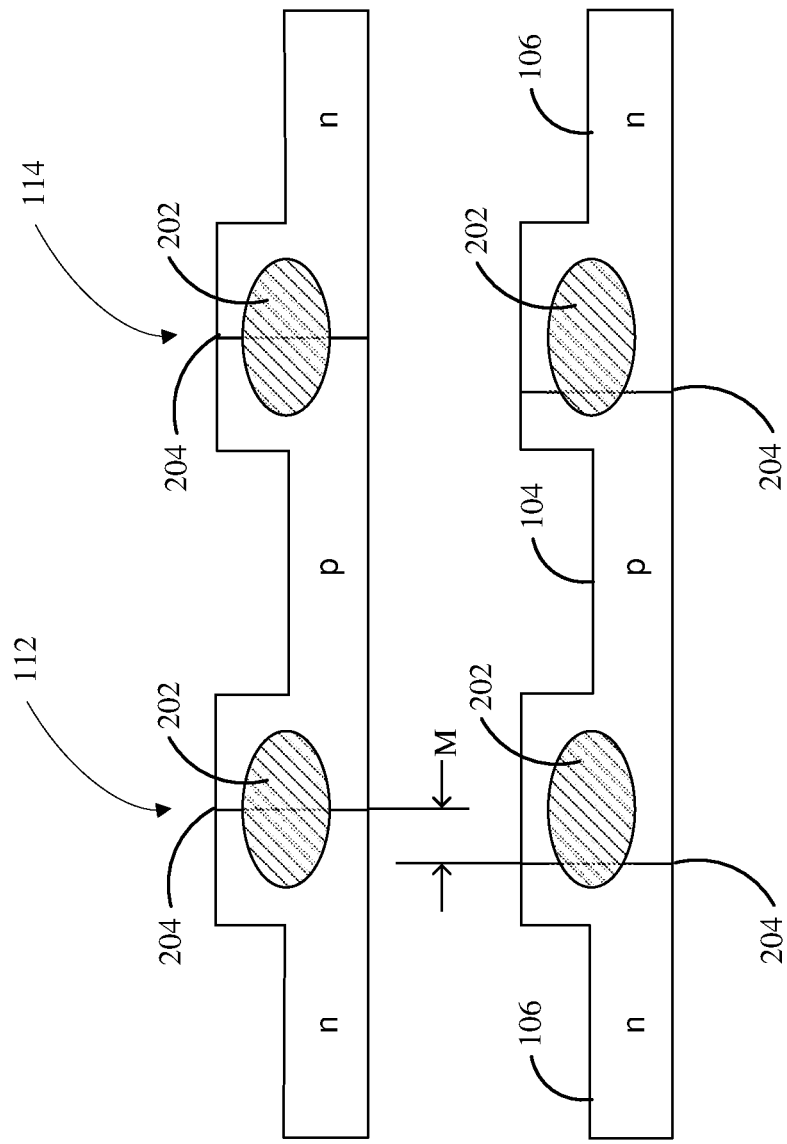
FIG. 2 is a schematic diagram illustrating the pn junctions of an SPP modulator configuration manufactured with correct and incorrect lithographic mask alignments.
Figure 3:
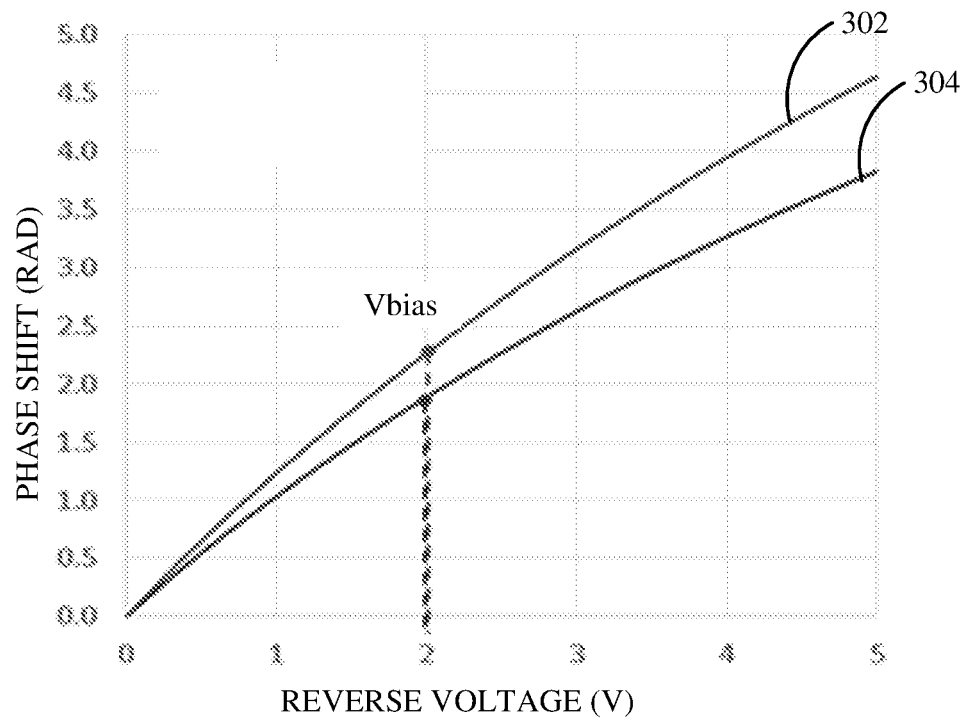
FIG. 3 is a graph that plots phase shift against applied voltage for each of the modulator arms of an optical modulator that could result from an imperfect fabrication.

As explained above with regards to FIG. 2, the pn junctions 204 of each of the modulator arms 112 and 114 have different amounts of p and n-doped material associated with the optical waveguides 202 when, for example, fabrication involves incorrect lithographic mask alignment(s) that defined the doped regions. FIG. 3 illustrates a voltage potential phase shift (in radians) obtained in each arm 112 and 114 of the optical modulator 100 in the case of such imperfect fabrication. Specifically, the curve 302 illustrates the phase shift in the modulator arm 112 resulting from different values of the applied reverse bias voltage Vbias, while the curve 304 illustrates the phase shift in the modulator arm 114 resulting from different values of the applied reverse bias voltage Vbias.

Although the phase shift difference at the applied reverse bias voltage (at 2V as shown) is not large, the different slopes at this operation point (i.e., the different efficiencies in terms of phase shift per unit voltage applied) are significant. Such an optical modulator 100 will induce chirp on the optical carrier and lead to incurring a penalty in the link budget.

Figure 1:
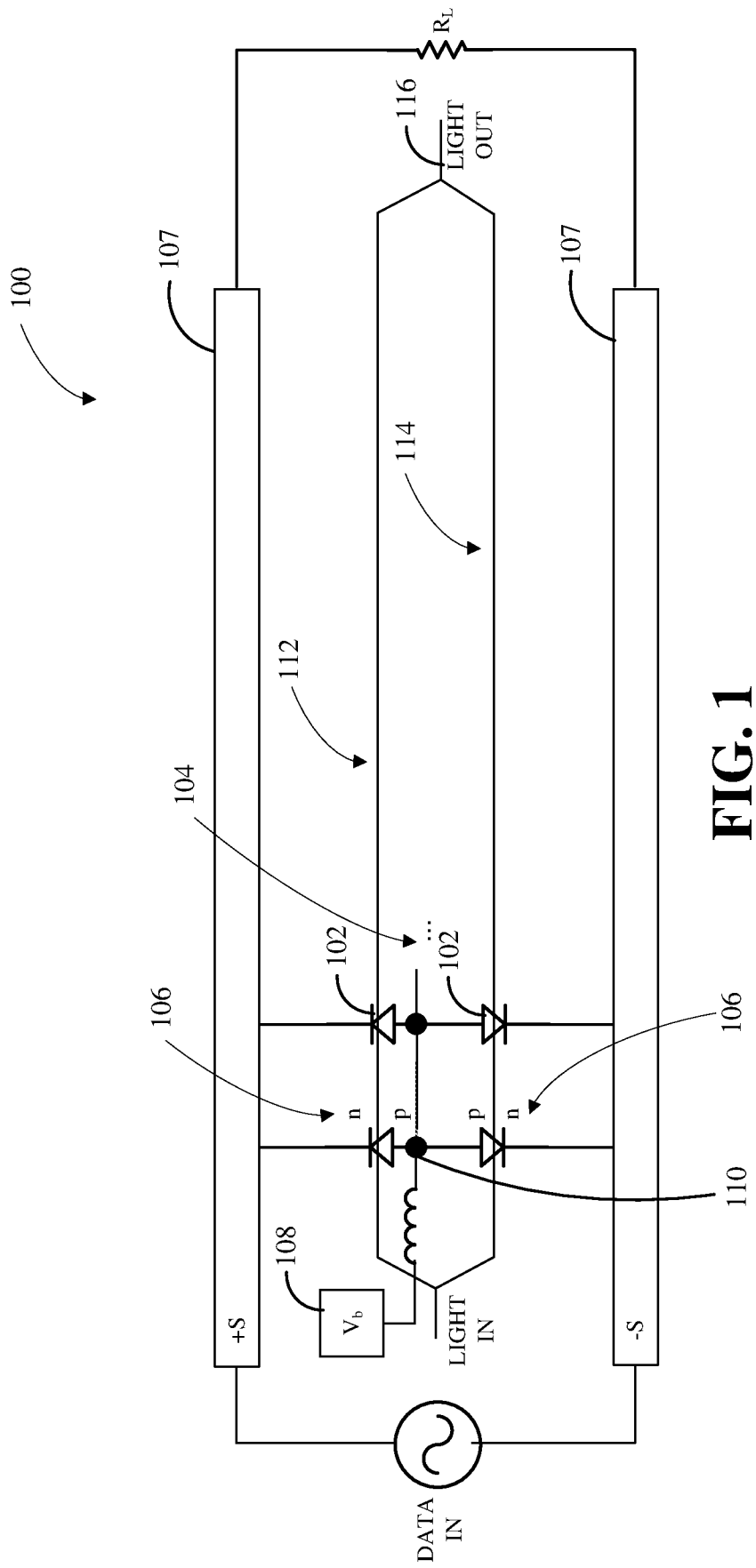
FIG. 1 is a schematic diagram illustrating an optical modulator in a nppn configuration.

A useful figure of merit for quantizing the effect of a mismatch in efficiency (i.e., a mismatch of $V_\pi$) between the arms 112 and 114 (FIG. 1) of the optical modulator 100 is the radio frequency (RF) imbalance $\alpha$. In accordance with a small modulation signal approximation, the phase shifts induced in both arms 112 and 114 around the reverse bias voltage of operation Vbias can be expressed as a mean phase shift $\Delta\phi_m$ produced in the two arms 112 and 114, plus or minus a deviation $\Delta\phi$ from it:

$$\Delta\phi_1 = \Delta\phi_m + \Delta\phi = \Delta\phi_m(1+\alpha) \quad (1)$$

$$\Delta\phi_2 = \Delta\phi_m - \Delta\phi = \Delta\phi_m(1+\alpha) \quad (2)$$

The imbalance (or, more generally, the RF imbalance) a is then the relative deviation from this mean phase shift. In the preceding, all phase shifts are defined as:

$$\Delta\phi_1 = \left.\frac{d\phi_1}{dV}\right|_{Vbias} \Delta V \quad (3)$$

where $\Delta V$ is the voltage difference with respect to the applied bias voltage.

The RF imbalance $\alpha$ can thus be expressed as a function of the slopes of the phase versus voltage characteristics using:

$$\alpha = \frac{\Delta\phi_1 - \Delta\phi_2}{2\Delta\phi_m} = \frac{\left.\frac{d\phi_1}{dV}\right|_{Vbias} - \left.\frac{d\phi_2}{dV}\right|_{Vbias}}{\left.\frac{d\phi_1}{dV}\right|_{Vbias} + \left.\frac{d\phi_2}{dV}\right|_{Vbias}} \quad (4)$$

For example, the RF imbalance at 2V reverse bias in the case of FIG. 3 is −0.096.

It is implicitly understood here that the efficiency of the two pn junctions 110 depends upon the frequency at which the voltage (+S, −S) is modulated. As such, differing modulation efficiencies between the two pn junctions 110 could result from them having differing capacitances, leading to a frequency-dependent imbalance, hence the term "RF" imbalance. Additional frequency dependency could result, for example, from the circuit configuration itself, which can lead to one pn junction being driven preferentially over the other at some frequencies, as can be the case of pn junctions 110 used in a SPP configuration and driven by a single-ended driver. For a modulation voltage varying in time, the paths followed on the curves illustrated in FIG. 3 will be different at each frequency of the modulating signal. Although the previous equations do not explicitly indicate the frequency dependency of $\alpha$ (i.e., $\alpha(f)$), such dependency is understood to be implicitly addressed and covered by the present disclosure.

Figure 4:
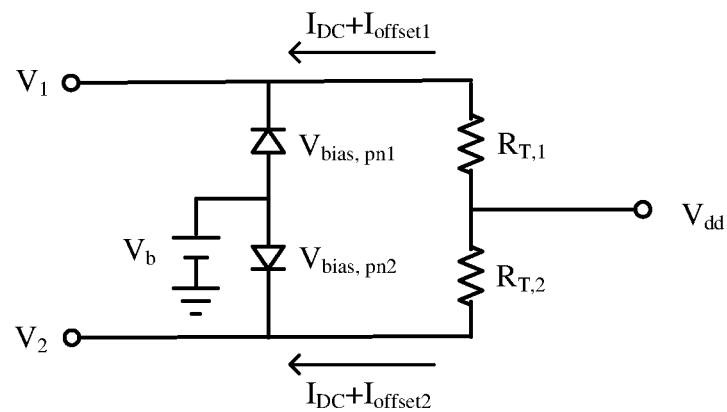
FIG. 4 is a circuit diagram illustrating driver output DC voltages applied to modulator electrodes, further connected to two pn junctions in series and to terminations.

Referring now to FIG. 4, with a direct current (DC)-coupled driver, some DC voltages are applied by the driver terminals to the modulator electrodes, such as the modulator electrodes 107. The DC voltages are illustrated by $V_1$ and $V_2$ in FIG. 4 (e.g., $V_1$ and $V_2$ can be the voltages at the collectors of a differential transistor pair). Also, optical modulators (such as MZ modulators) are often travelling-wave modulators that need to be terminated (illustrated as $R_{T,1}$ and $R_{T,2}$ in FIG. 4, which should ideally be of the same value, or as $R_L$ in FIG. 1). Finally, a frequent configuration is the open-collector configuration, which supplies the transistors' current through the termination, using some voltage, called $V_{dd}$ in FIG. 4. Other sources of imbalance between the two arms 112 and 114 of the optical modulator 100 can result from mismatched termination resistances (i.e., $R_{T,1} \approx R_{T,2}$) and mismatched transistors' $\beta$ parameter (i.e., DC current gain) within the driver. Even if the manufacture does not introduce misalignment of the pn junctions 110 (FIG. 1), these additional sources can contribute, in part, to the RF imbalance $\alpha$.

As a note, the DC (reverse) bias voltage applied to pn junction i is, according to FIG. 4:

$$V_{bias,i} = V_i - V_b = V_{dd} - R_{T,i} i_i - V_b \quad (5)$$

where $i_i$ is the DC current flowing through the termination resistor $R_{T,i}$.

Figure 5:
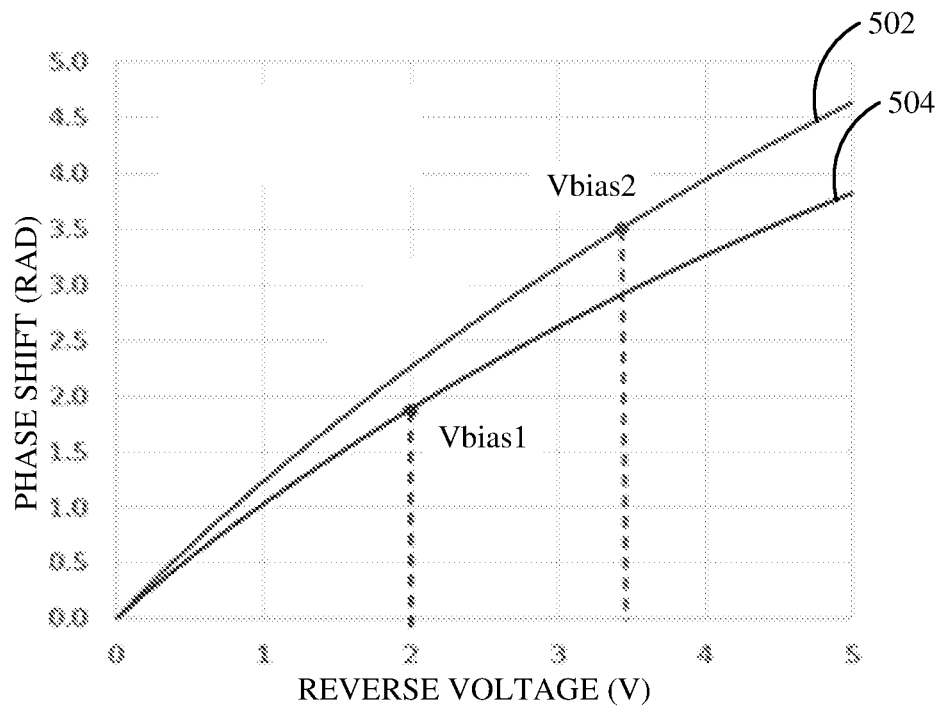
FIG. 5 is a graph that plots phase shift versus applied voltage for two arms of an optical modulator of the proposed solution, in the case of a manufacturing bias.
Figure 6:
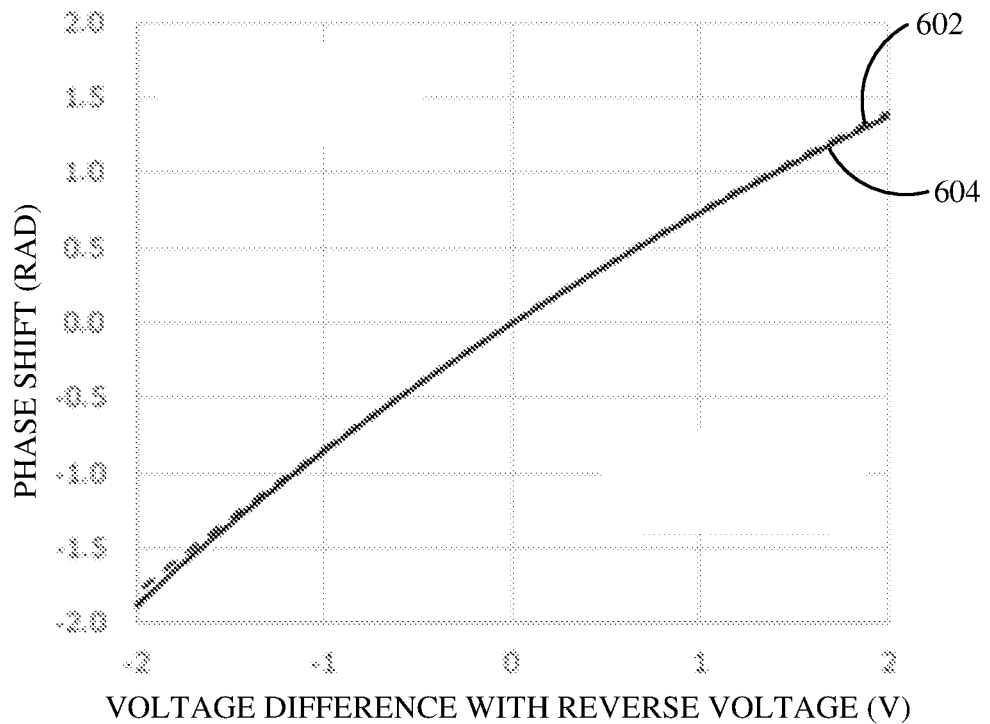
FIG. 6 is a graph that plots the phase shifts in first and second arms with the abscissa showing the offset voltage applied to either pn junction relative to its own reverse bias voltage.

In accordance with the teachings herein, the arms of the optical modulator 100 can be made to exhibit the same phase modulation efficiency regardless of any manufacturing error(s) by supplying a dissimilar reverse bias voltage to the two modulator arms 112 and 114. This is illustrated in FIG. 5, where separate bias voltages Vbias1 (2V) and Vbias2 (3.8V) are used for the first and second arms, respectively. At these operating points, the phase shift versus voltage slopes of curves 502, 504 are equal and, as such, the resulting RF imbalance is close to zero. FIG. 6 further illustrates this by removing the phase shift difference between the curves 502, 504 and by showing with the abscissa the modulation voltage applied to either pn junction relative to its own reverse bias voltage (i.e., Vbias,pn1 or Vbias,pn2). It can be seen that the two pn junctions then display very similar efficiencies (i.e., the same slope, or V$\pi$, for the adjusted curves 602, 604). Throughout the specification, references to "fabrication" or "manufacture" are understood as "wafer level manufacture."

According to FIG. 4, providing different bias voltages to the pn junctions can employ different voltages $V_1$ and $V_2$ at the driver output terminals. According to some implementations, this can be achieved through use of a current offset control circuit in the driver, as is described in greater detail herein below.

Figure 7:
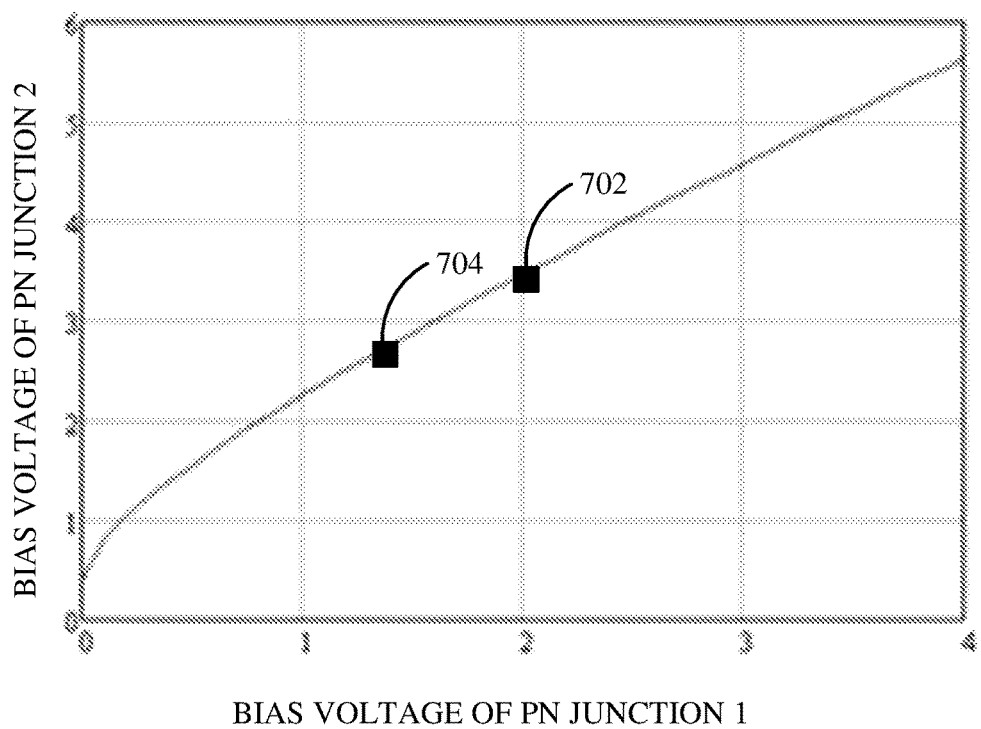
FIG. 7 is a graph that plots the bias voltage to use for pn junction 2 as a function of the bias voltage used for pn junction 1 enabling cancellation of the RF imbalance.
Figure 8:
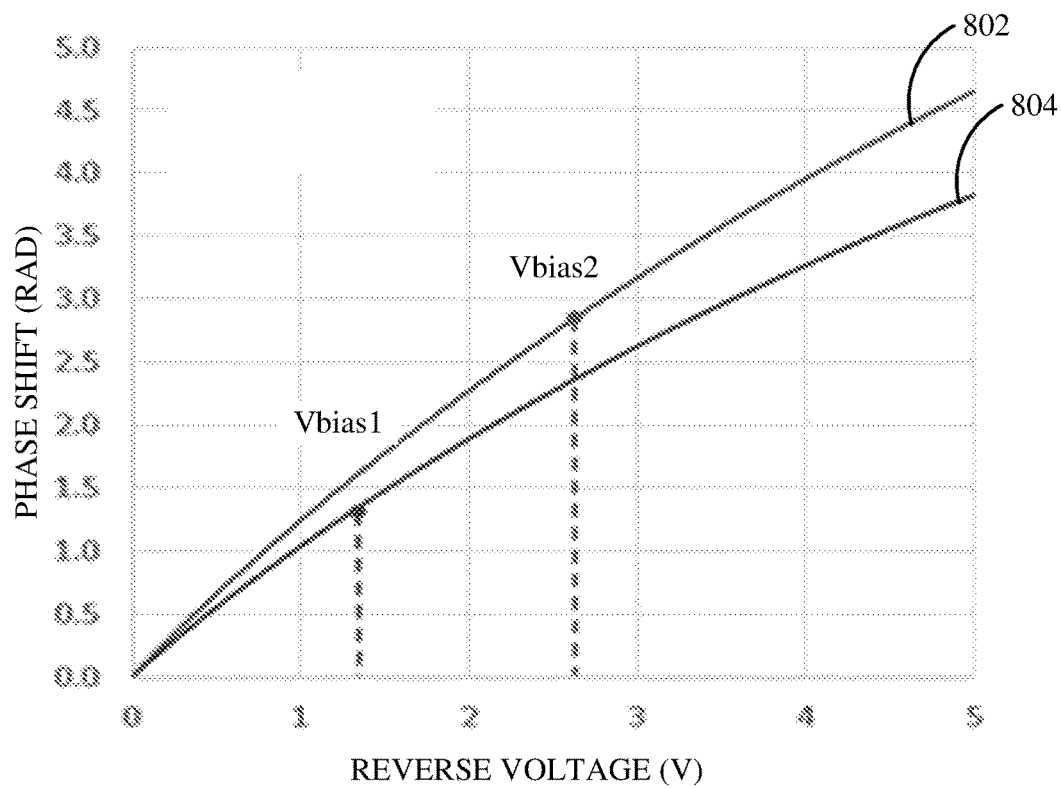
FIG. 8 is a graph that plots the symmetrical variation of the bias voltages around 2V providing cancellation of the RF imbalance.

Before describing examples of circuits that can be used to control the current offsets, one should observe that, in the previous example, one of the bias voltages was kept unchanged (at 2V) while the other was adjusted to cancel the RF imbalance. This is not necessarily the way electronic circuits operate. Rather, one of the bias voltages can be reduced, while the other can be increased, potentially by the same amount. considering the RF imbalance when the change in bias voltage for one pn junction is equal and opposite to that for the other pn junction. FIG. 7 shows sets of bias voltages for pn junction 1 (Vbias,pn1) and pn junction 2 (Vbias,pn2) that enable the cancellation of the RF imbalance. The point 702 illustrates the case used in FIG. 5. In contrast, at Vbias,pn1=1.33V and Vbias,pn2=2.67V (i.e., the point 704), the pn junction reverse bias voltages sit at equal distances on each side of the mean bias voltage of 2V, and the RF imbalance is cancelled. This configuration is illustrated in FIG. 8 relative to the curves 802, 804.

Figure 9:
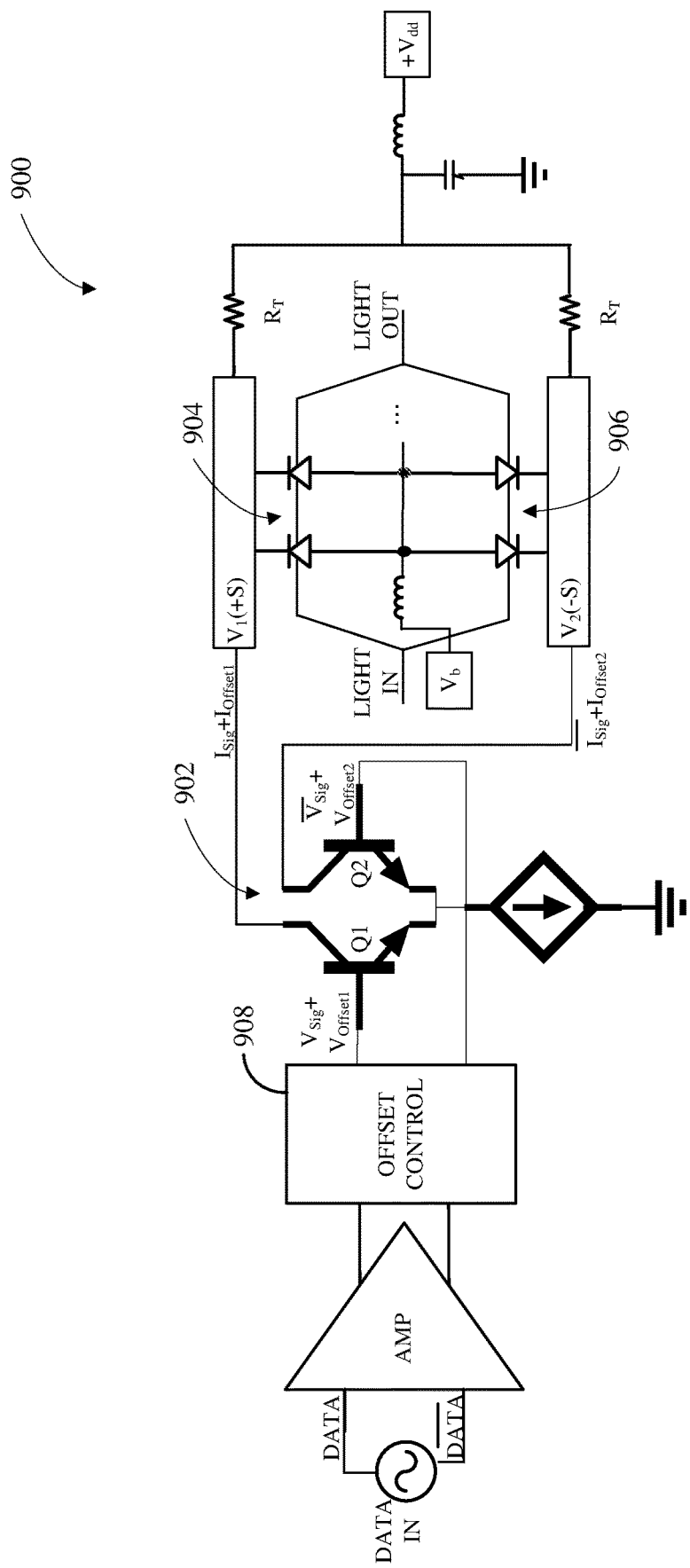
FIG. 9 is a schematic diagram illustrating an embodiment of a modulator device of the proposed solution using a nppn SPP configuration, driven with a dissimilar DC current from an open collector driver.

FIG. 9 illustrates a modulator device 900 of the proposed solution in the case of an open collector (i.e., a drain for MOS devices) driver (i.e., a current or transconductance driver) with a differential output 902, whereby each driver arm 904 and 906 provides a different DC current ($I_{Offset1}$ and $I_{Offset2}$). This results in a dissimilar voltage drop at the terminations $R_T$, resulting in a dissimilar reverse bias voltage for the two pn junctions forming the optical modulator. This configuration allows using a single bias voltage $V_b$ to polarize the pn junctions so that they operate in the depletion mode (i.e., reverse bias operation), but operate with different reverse bias voltages Vbias,pn1 and Vbias,pn2, as described above.

According to FIGS. 4 and 9, the change in the reverse bias voltage applied to pn junction i relates to the amount of current offset provided by the driver $I_{Offset,i}$ as follows:

$$\Delta V_{bias,i} = R_T I_{Offset,i} \quad (6)$$

In accordance with a practical example employing a mean driver DC current of 50 mA circulating in each resistor $R_T$, the amount of current variation could be limited to around ±20% of the driver current (i.e., ±10 mA). Across 25Ω resistors, this leads to a change in bias voltage of ±0.25V. Operating pn junction 1 at 1.75V and pn junction 2 at 2.25V leads to a RF imbalance α=−0.06, in the illustrative example presented earlier. Although this does not completely cancel the RF imbalance, it can be enough to make the optical modulator meet the applicable RF imbalance specification and/or make the overall system meet the applicable link budget. The use of such current offset capability within the driver can provide sufficient adjustment in the pn junction reverse bias to shift the statistical distribution of the modulator RF imbalance and increase the yield significantly.

Not only can this configuration compensate for optical modulator inefficiency, it can also compensate for manufacturing errors in the two termination resistors, $R_{T,1}$ and $R_{T,2}$, in FIG. 4. In an ideal scenario where the two modulator electrodes (such as electrodes 107) have no manufacturing errors and have identical efficiencies, the same DC voltages $V_1$ and $V_2$ (referring to FIG. 4) would be desirably applied to each electrode, where $V_1=V_2=V_{dd}-I_{DC}R_T$ (i.e., $I_{Offset}$ would be 0 in this case). However, due to manufacturing errors in the two resistors $R_T$ forming the termination, dissimilar voltage values for $V_1$ and $V_2$ could result, which would lead to unequal reverse bias voltages applied to the two pn junctions. In this case, the driver would be configured to apply different current offsets at the outputs of its two arms, such that the resultant voltage drops across $R_{T,1}$ and $R_{T,2}$ are similar; in other words, $I_{DC}R_{T,1}+I_{Offset1}R_{T,1}=I_{DC}R_{T,2}+I_{Offset2}R_{T,2}$.

This configuration can also correct for manufacturing errors in the driver's output transistors Q1 and Q2, where the two transistors could not be made identical through manufacture, resulting in differing values for $I_{Offset1}$ and $I_{Offset2}$. This results from a transconductance mismatch $g_m$, a mismatch in the current gain, or both. To compensate, dissimilar voltages $V_{Offset1}$ and $V_{Offset2}$ are applied to the base of transistors Q1 and Q2, respectively. In FIG. 9, the offset control 908 includes electronics determining the applicable current offsets.

Figure 10:
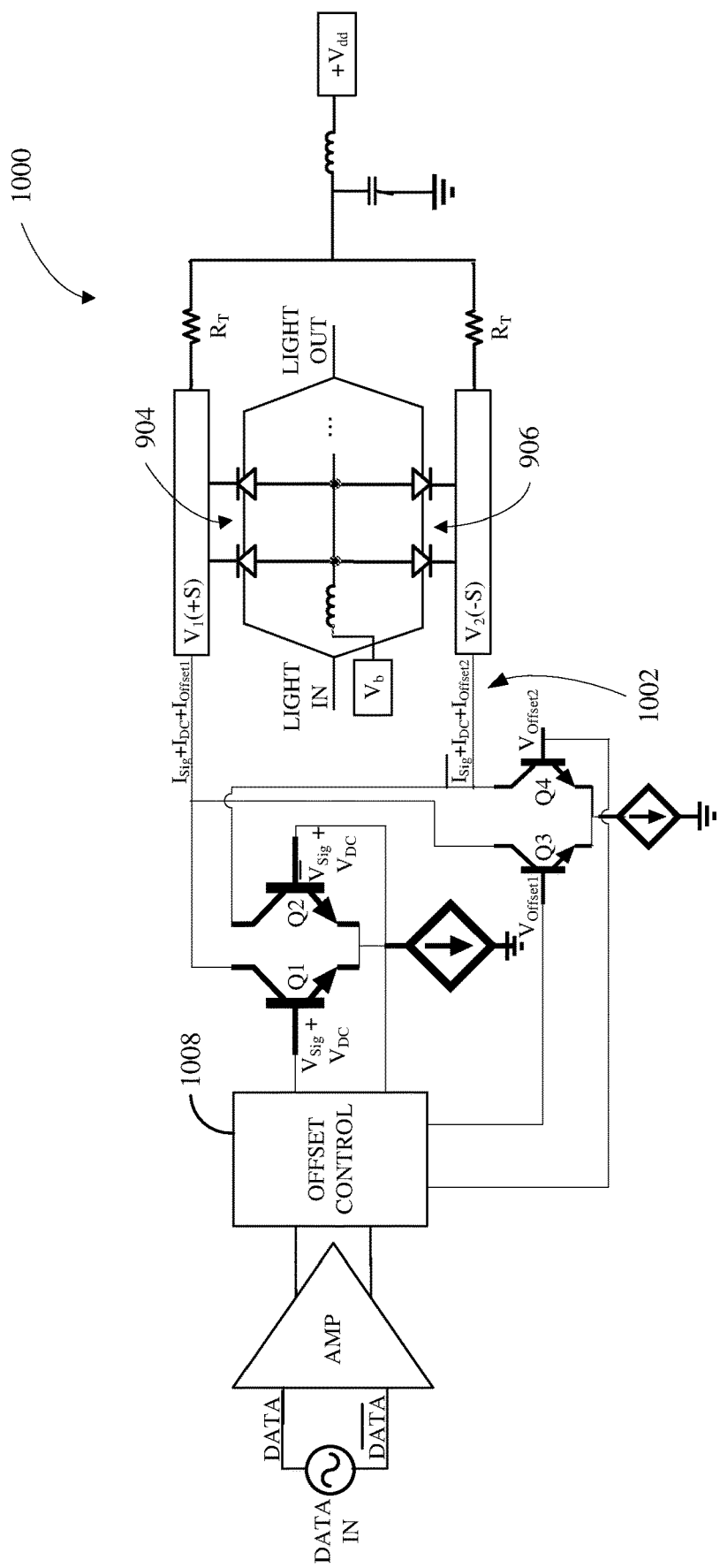
FIG. 10 is a schematic diagram illustrating another embodiment of a modulator device of the proposed solution using a nppn SPP configuration, driven with a dissimilar DC current from an open collector driver and with separate transistors providing offset currents.

FIG. 10 provides a variation of FIG. 9. That is, FIG. 10 illustrates a modulator device 1000 of the proposed solution in the case of an open collector driver where the offset is provided using two additional transistors Q3 and Q4. The transistors Q1 and Q2 provide the modulated complementary currents $I_{sig}$ and $\overline{I_{sig}}$ and DC current $I_{DC}$ responsive to differing voltages $V_{DC}+V_{sig}$ and $V_{DC}+\overline{V_{sig}}$ applied to the base of the transistors Q1 and Q2, respectively. Transistors Q3 and Q4 add the offset correction current $I_{Offset1}$ and $I_{Offset2}$ to correct for manufacturing errors responsive to differing voltages $V_{Offset1}$ and $V_{Offset2}$ applied to the base of the transistors Q3 and Q4, respectively. This combination enables a differential output 1002 having larger correction range for the pn junction reverse bias voltage, enabling not only reduction of the RF imbalance, but sufficient cancellation, while reducing distortion. In FIG. 10, the offset control 1008 includes electronics determining the applicable voltage offsets.

Figure 11:
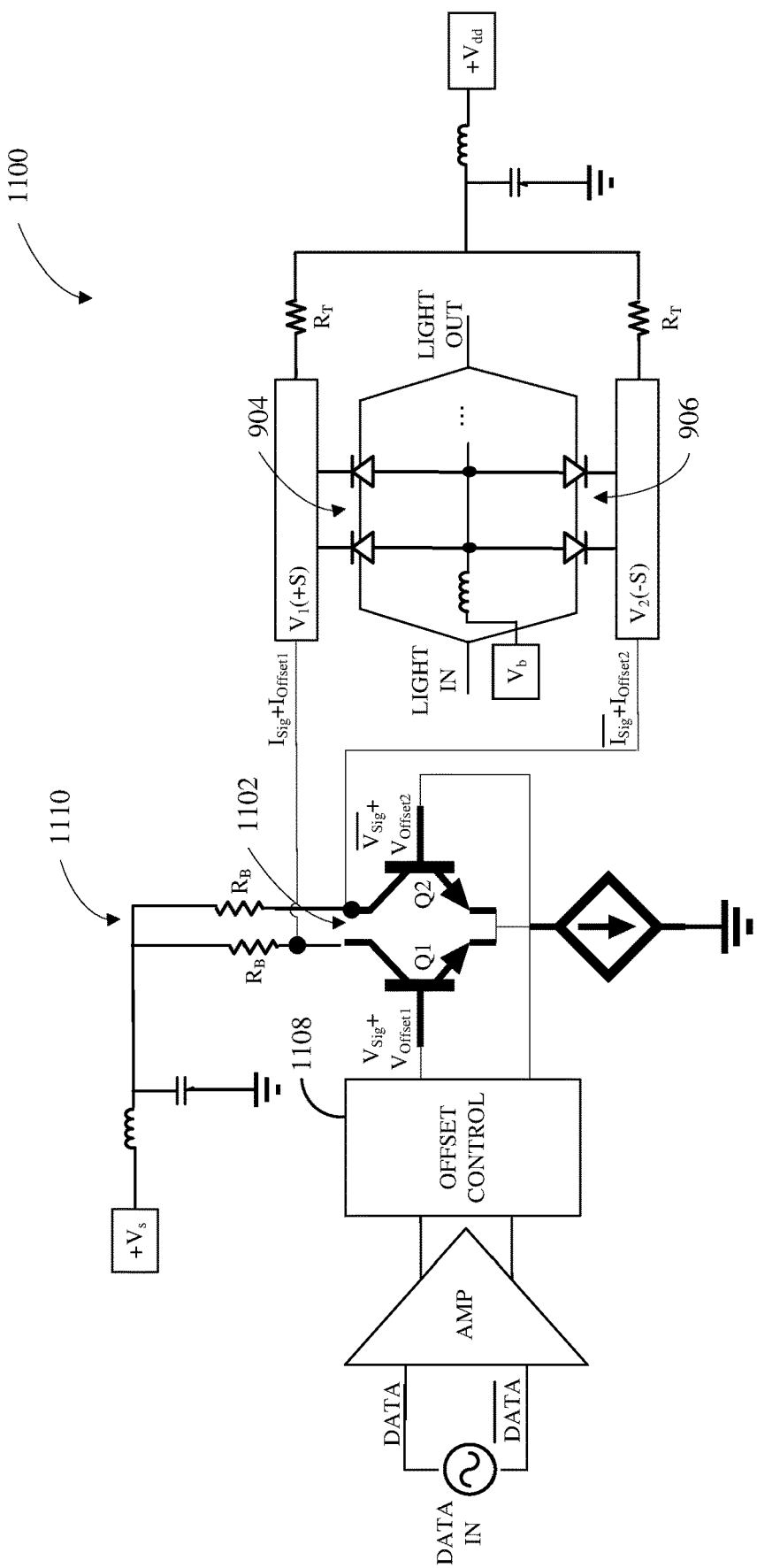
FIG. 11 is a schematic diagram illustrating a further embodiment of a modulator device of the proposed solution using a nppn SPP configuration, driven with a dissimilar DC current from a back-terminated differential driver.

FIG. 11 illustrates a modulator device 1100 of the proposed solution employing a back-terminated differential driver 1110 with a differential output 1102, whereby each driver arm 904 and 906 provides a different DC current ($I_{Offset1}$ and $I_{Offset2}$) responsive to differing voltages $V_{sig}+V_{Offset1}$ and $\overline{V_{sig}}+V_{Offset2}$ applied to the base of the transistors Q1 and Q2, respectively. Again, this results in a dissimilar voltage drop at the termination resistors $R_T$, resulting in dissimilar reverse bias voltages for the two pn junctions of the modulator device 1100. This configuration allows using a single bias voltage $V_b$ to bias the pn junctions so that they operate in the depletion mode (i.e., reverse bias operation), but operate with different individual reverse bias voltages Vbias,pn1 and Vbias,pn2, as described above. In FIG. 11, the offset control 1108 includes electronics determining the applicable voltage offsets.

Figure 12:
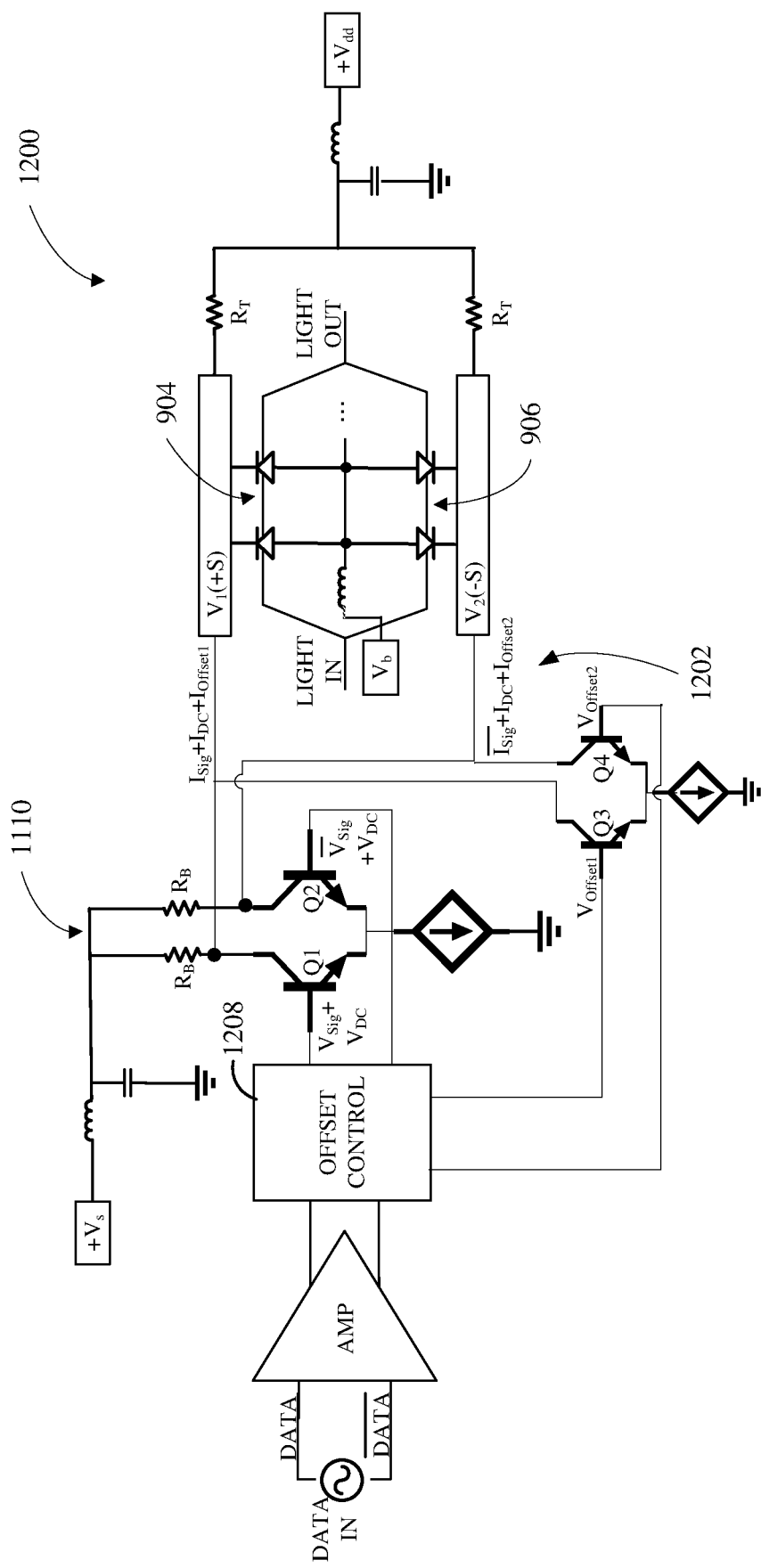
FIG. 12 is a schematic diagram illustrating a further embodiment of a modulator device of the proposed solution using a nppn SPP configuration, driven with a dissimilar DC current from a back-terminated differential driver and with separate transistors providing offset currents.

FIG. 12 provides a variation of FIG. 11, where the offset is provided using two additional transistors Q3 and Q4. That is, FIG. 12 is a modulator device 1200 of the proposed solution using a nppn SPP configuration driven with a dissimilar DC current from a back-terminated differential driver, which further includes separate transistors Q3 and Q4 providing offset currents. The transistors Q1 and Q2 provide the modulated complementary currents $I_{sig}$ and $\overline{I_{sig}}$ and DC current $I_{DC}$ responsive to differing voltages $V_{DC}+V_{sig}$ and $V_{DC}+\overline{V_{sig}}$ applied to the base of the transistors Q1 and Q2, respectively. Transistors Q3 and Q4 add the offset correction current $I_{Offset1}$ and $I_{Offset2}$ to correct for manufacturing errors responsive to differing voltages $V_{Offset1}$ and $V_{Offset2}$ applied to the base of the transistors Q3 and Q4, respectively. Again, like the difference between the configuration of FIG. 10 as compared to that in FIG. 9, this configuration enables a differential output 1202 a larger correction range for the pn junction reverse bias voltage as compared to the configuration of FIG. 11. This enables not only reduction of the RF imbalance, but sufficient cancellation, while reducing distortion. In FIG. 12, the offset control 1208 includes electronics determining the applicable voltage offsets.

Figure 13:
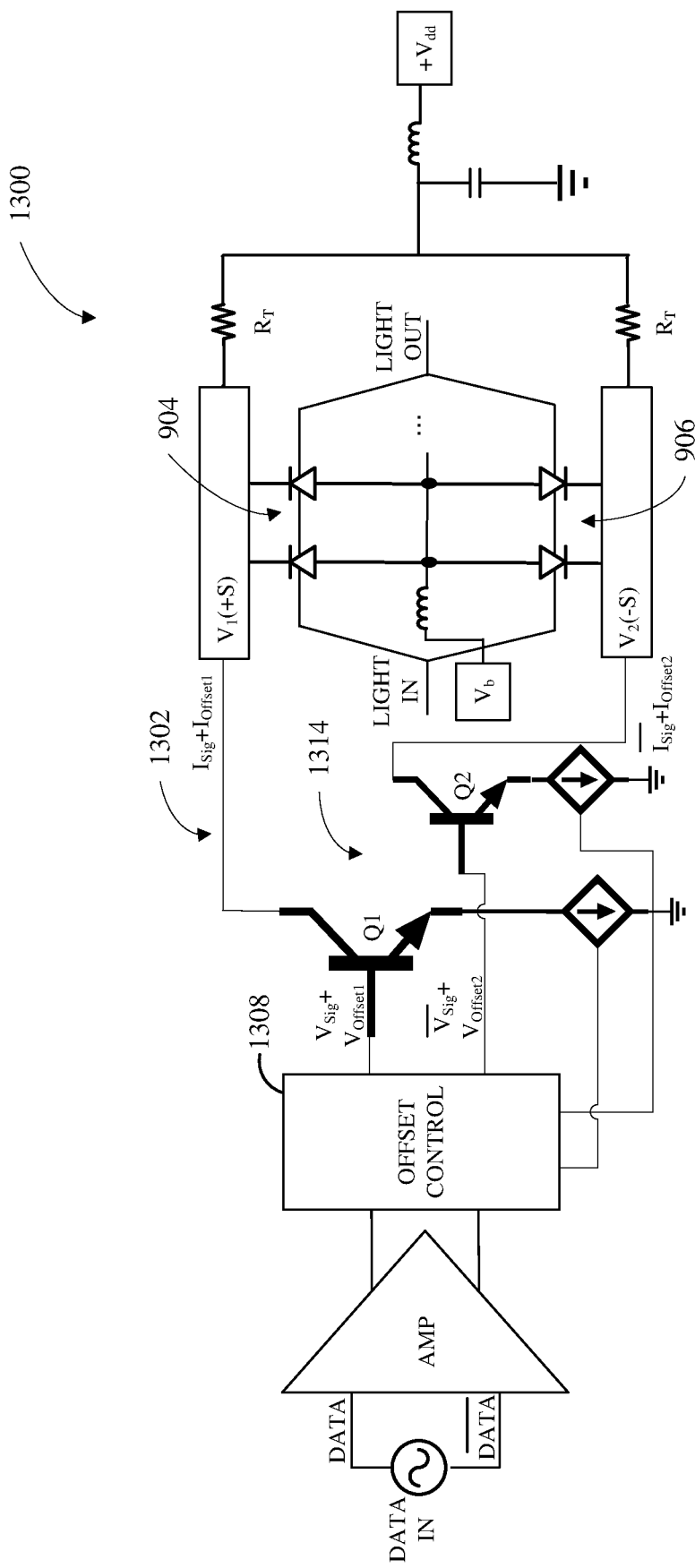
FIG. 13 is a schematic diagram illustrating a further embodiment of a modulator device of the proposed solution using a nppn SPP configuration, driven with a dissimilar DC current from an open collector driver, where a single-ended output is utilized with two transistors controlling the offset current sourced from two independent current sources.

FIG. 13 illustrates a modulator device 1300 of the proposed solution employing an open collector (i.e., a drain for MOS devices) driver (i.e., a current or transconductance driver) with a differential output 1302. Each driver arm 904 and 906 provides a different DC current ($I_{sig}+I_{Offset1}$ and $\overline{I_{sig}}+I_{Offset2}$) responsive to differing voltages $V_{sig}+V_{Offset1}$ and $\overline{V_{sig}}+V_{Offset2}$ applied to the base of the transistors Q1 and Q2, respectively. This results in a dissimilar voltage drop at the termination resistors $R_T$, resulting in a dissimilar reverse bias voltage for the two pn junctions forming the modulator device 1300. This configuration allows using a single bias voltage $V_b$ to bias the pn junctions so that they operate in the depletion mode (i.e., reverse bias operation), but operate with different individual reverse bias voltages Vbias,pn1 and Vbias,pn2, as described above. In this single-ended output embodiment, Q1 and Q2, which control the offset current, are sourced from two independent current sources associated with the open collector driver 1314. In FIG. 12, the offset control 1308 includes electronics determining the applicable voltage offsets.

Figure 14:
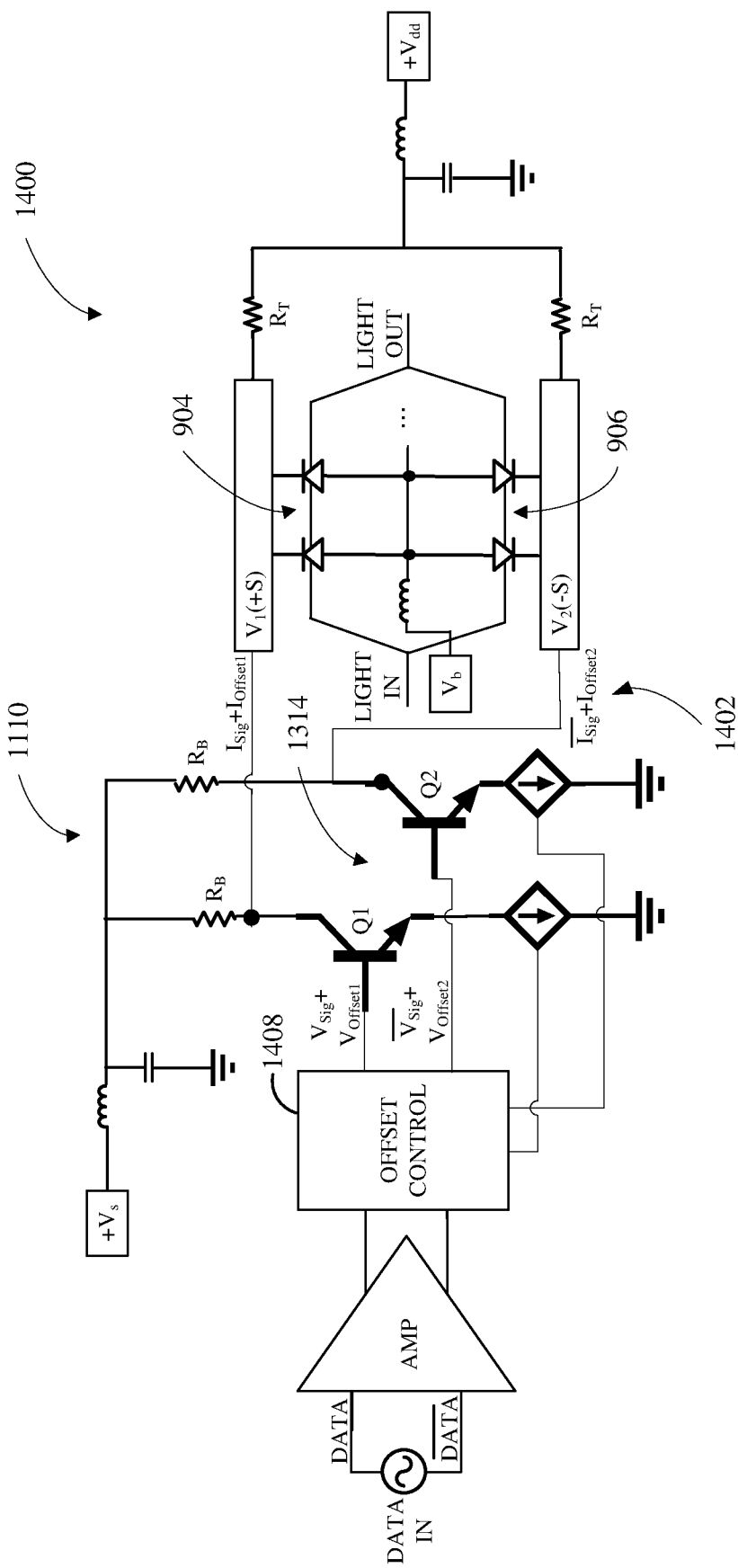
FIG. 14 is a schematic diagram illustrating a further embodiment of a modulator device of the proposed solution using a nppn SPP configuration, driven with a dissimilar DC current from a back-terminated differential driver, where a single-ended output is utilized with two transistors controlling the offset current sourced from two independent current sources.

FIG. 14 illustrates a modulator device 1400 of the proposed solution employing a back-terminated differential driver 1110 with a differential output 1402, whereby each driver arm 904 and 906 provides a different DC current ($I_{Offset1}$ and $I_{Offset2}$) responsive to differing voltages $V_{sig}+V_{Offset1}$ and $\overline{V_{sig}}+V_{Offset2}$ applied to the base of the transistors Q1 and Q2, respectively. Again, this results in a dissimilar voltage drop at the termination resistors $R_T$, resulting in a dissimilar reverse bias voltage for the two pn junctions of the modulator device 1400. This configuration employs a single bias voltage $V_b$ to bias the pn junctions so that they operate in the depletion mode (i.e., reverse bias operation), but operate with different reverse bias voltages Vbias,pn1 and Vbias,pn2, as described above. In this single-ended output embodiment, the transistors Q1 and Q2, which control the offset current, are again sourced from two independent current sources associated with the back-terminated differential driver 1314. In FIG. 12, the offset control 1308 includes electronics determining the applicable offset signals (here, voltage offsets).

In general, the optical devices above describe an optical modulator control circuit that can generate a first input voltage $V_{sig}$ and a second input voltage $V_{sig}$. These voltages are determined to produce a target phase modulation between a first optical waveguide arm 904 and a second optical waveguide arm 906 of an optical modulator. An offset control circuit, such as offset control 1008, 1108, 1208, 1308, 1408, is configured to generate a first offset signal $V_{sig}+V_{offset1}$ or $V_{offset1}$ and a second offset signal $\overline{V_{sig}}+V_{Offset2}$ or $V_{Offset2}$ based on the first input voltage and the second input voltage. Different implementations of a linear modulator driver receive the first offset signal and the second offset signal, and then generate, using the first offset signal, a first output voltage $V_1$ for biasing the first optical waveguide arm and generate, using the second offset signal, a second output voltage $V_2$ for biasing the second optical waveguide arm. The first output voltage is different from the first input voltage and/or the second output voltage is different from the second input voltage.

In the above optical modulator devices, the linear modulator driver comprises an open collector (high impedance current source) architecture to drive the optical (e.g., MZ) modulator to reduce an imbalance of the phase modulation of the optical modulator that, in turn, creates an undesirable phase variation of the optical carrier at the output of the modulator. The imbalance may be caused by fabrication errors in the processing and manufacture of the modulator, offsets (voltage or current) at the output of a driver, or both. As described in additional detail below, other linear modulator driver architectures may be used as the linear modulator driver, such as a differential push-pull amplifier (low impedance, voltage source) architecture that allows a large swing to correct for dissimilarity between the two arms of the optical modulator, and hence reduces or eliminates the imbalance. That is, for example, a linear modulator driver can intentionally introduce an offset current control to create an offset voltage at the driver output to compensate the modulator imbalance, the driver's own imbalance, or both.

A feedback mechanism or feedback circuit may be used to measure the offset voltage and provide it as input to an offset control for the driver.

Figure 15:
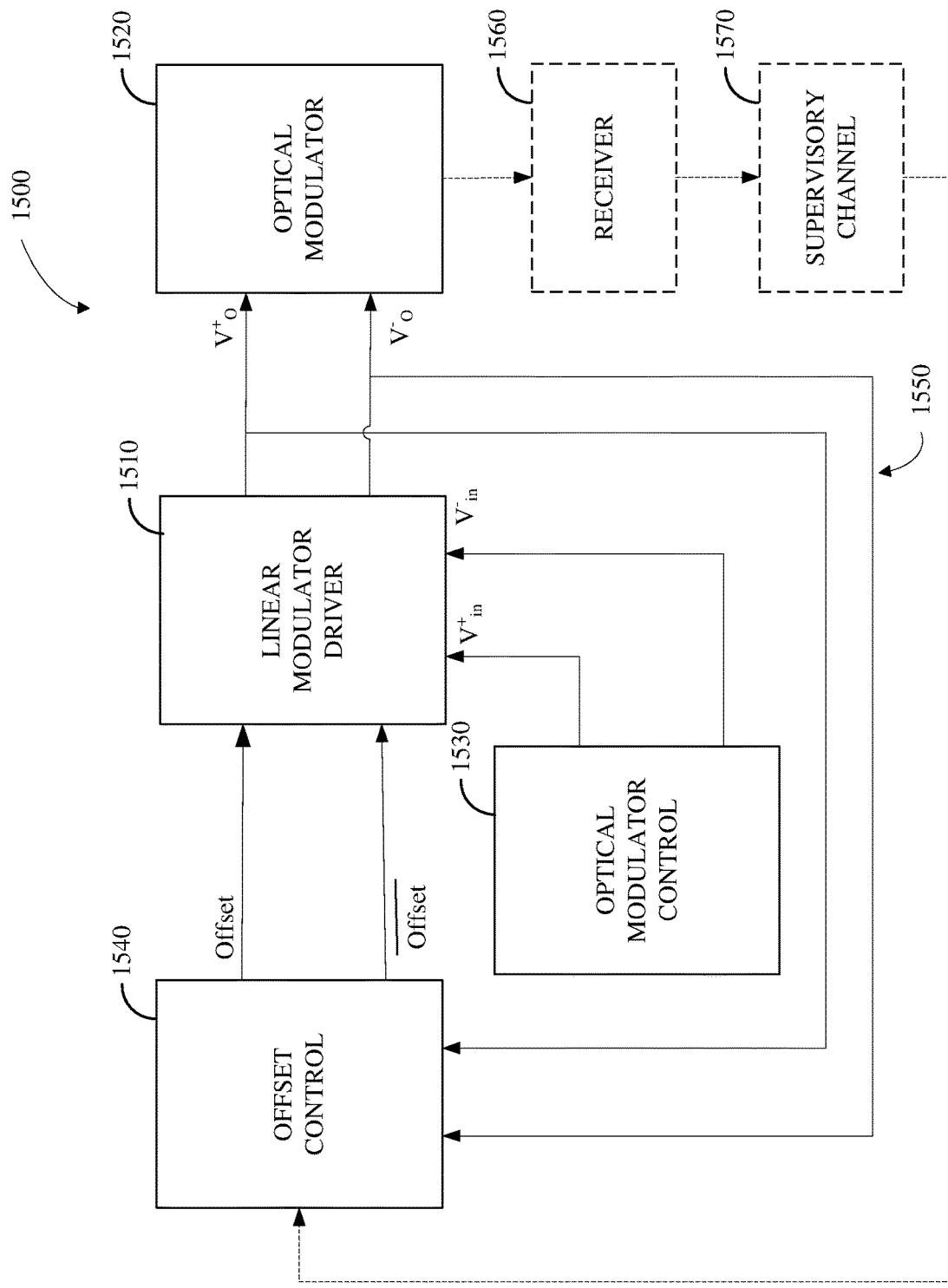
FIG. 15 is a functional block diagram of a modulator device that includes a linear modulator driver coupled to an optical modulator.

Implementations of such a linear modulator driver may be explained generally with reference to the functional block diagram of FIG. 15. In FIG. 15, the optical modulator device or apparatus 1500 includes a linear modulator driver 1510 that is coupled to and drives an optical modulator 1520. As with the above examples, an optical modulator control 1530 is included. The optical modulator control 1530 provides target voltages $V_{in}^+$ and $V_{in}^-$ for operation of the optical modulator 1520. For example, the target or input voltages $V_{in}^+$ and $V_{in}^-$ may be voltages that, when applied to respective electrodes of the optical modulator 1520, cause the optical modulator 1520 to produce the desired output absent the imbalances described above. More specifically, the optical modulator control 1530 is a control circuit that generates a first input voltage $V_{in}^+$ and a second input voltage $V_{in}^-$, where the first input voltage $V_{in}^+$ and the second input voltage $V_{in}^-$ are based on a target phase modulation between a first optical waveguide arm and a second optical waveguide arm of the optical modulator 1520. The target phase modulation may correspond to a target difference between the values for Vbias,pn1 and Vbias,pn2, such as a target difference of 0 or close to 0, for example. The target phase modulation may represent a condition wherein the first optical waveguide arm and the second optical waveguide arm exhibit the same phase modulation or a defined different phase modulation.

Offset control 1540, as also included in the previous examples, produces offset signals Offset and $\overline{\text{Offset}}$ for input into the linear modulator driver 1510. Offset control 1540 in this example is an offset control circuit that generates a first offset signal Offset and a second offset signal $\overline{\text{Offset}}$ based on the first input voltage $V_{in}^+$ and the second input voltage $V_{in}^-$. That is, in accordance with the initial discussion of the problem, a control signal for the offset control 1540 introduces a difference DC voltage to the input voltages $V_{in}^+$ and $V_{in}^-$ to either null out the difference in the driver's own output asymmetry, the optical modulator imbalance, or both.

In the examples below, the offset signals to achieve this are current offset signals, $I_{Offset}$ and $\overline{I_{Offset}}$, that are based on the first input voltage $V_{in}^+$ and the second input voltage $V_{in}^-$, for example, based on the values needed to generate the first output voltage $V_O^+$ (corresponding to V1 in FIG. 4) and the second output voltage $V_O^-$ (corresponding to V2 in FIG. 4) given the target values for these values, e.g., the input voltages $V_{in}^+$ and $V_{in}^-$, to achieve the desired modulator output.

The linear modulator driver 1510 is a driver control circuit that receives the first offset signal Offset and the second offset signal $\overline{\text{Offset}}$. The linear modulator driver 1510 generates the first output voltage $V_O^+$ for biasing the first optical waveguide arm of the optical modulator 1520 using the first offset signal Offset, and generates the second output voltage $V_O^-$ for biasing the second optical waveguide arm of the optical modulator 1520 using the second offset signal $\overline{\text{Offset}}$. At least one of the first output voltage $V_O^+$ is different from the first input voltage $V_{in}^+$ or the second output voltage $V_O^-$ is different from the second input voltage $V_{in}^-$. More specifically, as explained above with regards to FIG. 7, one of the voltages applied to bias an arm may be kept unchanged while the other may be adjusted to cancel any (e.g., RF) imbalance.

In the examples described herein, each of the voltages applied to bias a respective arm may be changed. That is, one voltage such as the first input voltage $V_{in}^+$ may be reduced to the first output voltage $V_O^+$, while the other such as the second input voltage $V_{in}^-$ may be increased to the second output voltage $V_O^-$. The change to each may be made by the same offset amount, or a different offset amount. Where the first offset signal is the first offset current Ioffset and the second offset signal is the second offset current $\overline{\text{Ioffset}}$, the linear modulator driver 1510 may receive the first input voltage $V_{in}^+$ and the second input voltage $V_{in}^-$, generate the first output voltage $V_O^+$ for biasing the first optical waveguide arm by modifying the first input voltage $V_{in}^+$ using the first offset current Ioffset, and generate the second output voltage $V_O^-$ for biasing the second optical waveguide arm by modifying the second input voltage $V_{in}^-$ using the second offset current $\overline{\text{Ioffset}}$.

An optional feedback mechanism or circuit 1550 may supply the first output voltage $V_O^+$ and the second output voltage $V_O^-$ to the offset control 1540 for use in generating the values for the first offset signal Offset and the second offset signal $\overline{\text{Offset}}$. Another optional feedback mechanism or circuit comprises a receiver 1560 and a supervisory channel 1570 that may feed back a signal based on the output of the optical modulator 1520 as input to the offset control 1540 for modifying the first offset signal and the second offset signal. Each of these circuits is discussed in additional detail below.

Figure 16:
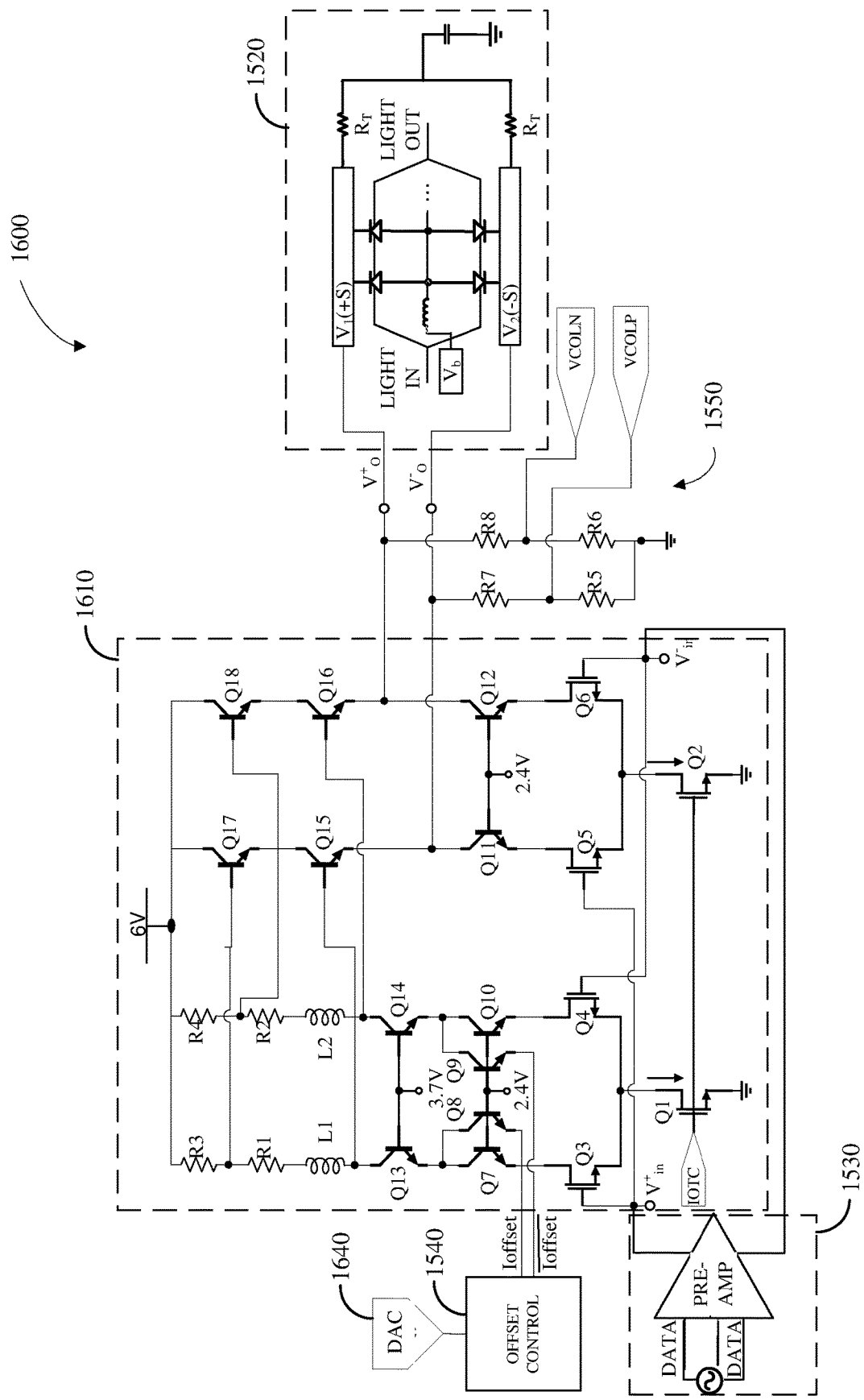
FIG. 16 is a schematic diagram illustrating an embodiment of a modulator device of the proposed solution using a nppn SPP configuration, driven by an asymmetrical DC voltage from a dual series-stacked emitter follower push-pull differential driver.

FIG. 16 is a schematic diagram illustrating an embodiment of a modulator device 1600 of the proposed solution using a nppn SPP configuration, driven by an asymmetrical DC voltage from a dual series-stacked emitter follower push-pull differential driver 1610 as the linear modulator driver 1510. This linear modulator driver 1610 is a modification to a driver architecture presented in the paper: "57.5 GHz Bandwidth 4.8Vpp Swing Linear Modulator Driver for 64Gbaud m-PAM Systems", by A. Zandieh in 2017. That driver architecture includes, in an output stage, a linear series-stacked differential emitter follower and a linear cascode. In the linear modulator driver 1610 of FIG. 16, the linear series-stacked differential emitter follower comprises the transistors Q15-Q18 and the linear cascode comprises MOSFET-transistor (MOS-HBT) pairs including Q11 and Q5 and Q12 and Q6.

In addition, the linear modulator driver 1610 includes two transistors Q8 and Q9, which are driven by two offset signals, in this example the first current set $I_{offset}$ and the second current offset $\overline{I_{offset}}$, in the second linear cascode to raise the signal level driving two further series-stacked emitter followers (i.e., the transistor pairs Q3 and Q7 and Q4 and Q10). As shown, the first current offset $I_{offset}$ and the second current offset $\overline{I_{offset}}$ are supplied by the offset control 1540 using a control signal provided through a digital to analog converter DAC 1640. The control signal corresponds to the control signal described above that introduces a difference DC voltage value in the p and n output complements. In this example, the offset control is fed by a control current IOOFS (current output offset signal) using a (e.g., on-chip) DAC 1640. However, the offset control 1540 may also be fed by a (e.g., off-chip) control voltage.

The optical modulator control 1530, like the control shown in the previous solutions, includes a source AC signal that provides an alternating DATA signal that is amplified to provide inputs to the linear modulator driver 1510. In this case, the amplifier is referred to as a pre-amp to reflect that the first input voltage $V_{in}^+$ and the second input voltage $V_{in}^-$ are subsequently modified by the linear modulator driver 1510. Specifically, the optical modulator control 1530 applies the first input voltage $V_{in}^+$ and the second input voltage $V_{in}^-$ to a gate of each of the linear cascodes, applying the first input voltage $V_{in}^+$ to the gate of the transistors Q3, Q5 and applying the second input voltage $V_{in}^-$ to the gate of the transistors Q4, Q6. The linear cascodes are biased by transistors Q1, Q2 having a common voltage applied to their gates (e.g., based on the current IOTC), and with their respective sources coupled to ground.

As mentioned, driving the two transistors Q8 and Q9 by the first current offset $I_{offset}$ and the second current offset $\overline{I_{offset}}$ in the second linear cascode raises the signal level driving two series-stacked emitter followers. This raised signal level results in a dissimilar voltage drop at the resistor dividers R1/R3 and R2/R4, which in turn results in a dissimilar voltage at the base of each emitter follower series-stacked pair Q15/Q18 and Q16/Q18. As a result, the output appearing at the lower emitter followers Q15, Q16 are level shifted down from the voltage appearing at their respective bases. This, in turn, results in a DC difference at the output, namely the second output voltage $V_O^-$ and the first output voltage $V_O^+$ and a dissimilar reverse bias voltage for the two pn junctions forming the optical modulator 1520, in this example a SPP MZ modulator.

This configuration allows using a single bias voltage $V_b$ to polarize the pn junctions so that they operate in the depletion mode (reverse bias operation), and also operate with different reverse bias voltages Vbias,pn1 and Vbias,pn2, as explained earlier. Specifically, and referring to FIG. 4, the change in the reverse bias voltage applied to pn junction i relates to the amount of current offset $\Delta I_{offset}$ provided to the driver 1610, as follows:

$$\Delta V_{bias} = (R1+R3)\Delta I_{offset} \quad (7)$$

In equation (7), it is assumed that $\Delta I_{offset} = I_{offset} - \overline{I_{offset}}$, and the resultant voltage drop at R1+R3 equals that at R2+R4.

In an example of operation of the optical modulator device 1600, a DC current is shared between the left and right cascodes, the amount of current offset between Q13 and Q14 could be limited to about ±10% of the driver current (i.e., about ±5 mA). Assuming values of R1=48Ω and R3=12Ω, a drop across R1+R3 leads to a change in voltage of ±0.30V. Operating pn junction 1 at 1.7V and pn junction 2 at 2.3V as described in the example of FIG. 8 leads to a RF imbalance of −0.07. Although the driver does not cancel the RF imbalance, this RE imbalance can be sufficient to make the optical modulator 1520 meet an RF imbalance design specification, meet a desired link budget, or both. The use of such current offset capability within the linear modulator driver 1610 can provide sufficient adjustment in the pn junction reverse bias to shift the statistical distribution of the RF imbalances and significantly increase the resulting yield.

Implementations of the optical modulator device 1500, such as the optical modulator device 1600, in addition to compensating for the modulator inefficiency, can also compensate for fabrication errors in components of the driver. For example, the optical modulator device 1600 can compensate for fabrication errors in the resistor divider networks comprising $(R_1+R_3)$ and $(R_2+R_4)$. In an ideal scenario where the modulator electrodes have no fabrication error and have identical efficiencies, the same values for the DC output voltages $V_O^+$ and $V_O^-$ would be desired on the respective electrodes and $\Delta I_{offset}=0$. However, fabrication error in one or both of the two resistors in the resistor divider network driving the two series-stacked emitter followers, may result in dissimilar values for the first output voltage $V_O^+$ and the second output voltage $V_O^-$. In turn, the dissimilar values would lead to unequal reverse bias voltages for the two pn junctions. In such a case, the transistors Q8 and Q9 can apply different current offsets, so that the resultant voltage drops across R1+R3 and R2+R4, are identical. In other words, $(R1+R3)I_{offset} = (R2+R4)\overline{I_{offset}}$.

As another example, the optical modulator device 1600 can compensate for fabrication errors in the left cascode transistors Q3 and Q4. Such errors may result where the respective transconductance gain $g_n$ and/or the respective current gain β of the two transistors Q3, Q4 are not identical. The errors result in differing currents through Q13 and Q14. To compensate, dissimilar values for $\Delta I_{offset}$ may be applied to the emitter of Q8 and Q9.

For the above compensation, the optional feedback mechanism or circuit 1550 may be implemented that passes feedback voltages corresponding to the first output voltage $V_O^+$ and the second output $V_O^-$ to the offset control 1540. The offset control 1540 can then modify the first offset signal (e.g., $I_{offset}$), the second offset signal (e.g., $\overline{I_{offset}}$), or both, while maintaining the same voltage offset at the output to the optical modulator 1520 that corrects for manufacturing errors therein, if any. In FIG. 16, the feedback circuit 1550 includes respective resistor divider networks R5/R7 and R6/R8 are used to measure the output or voltage offset, generally through an analog to digital converter (ADC).

Figure 17:
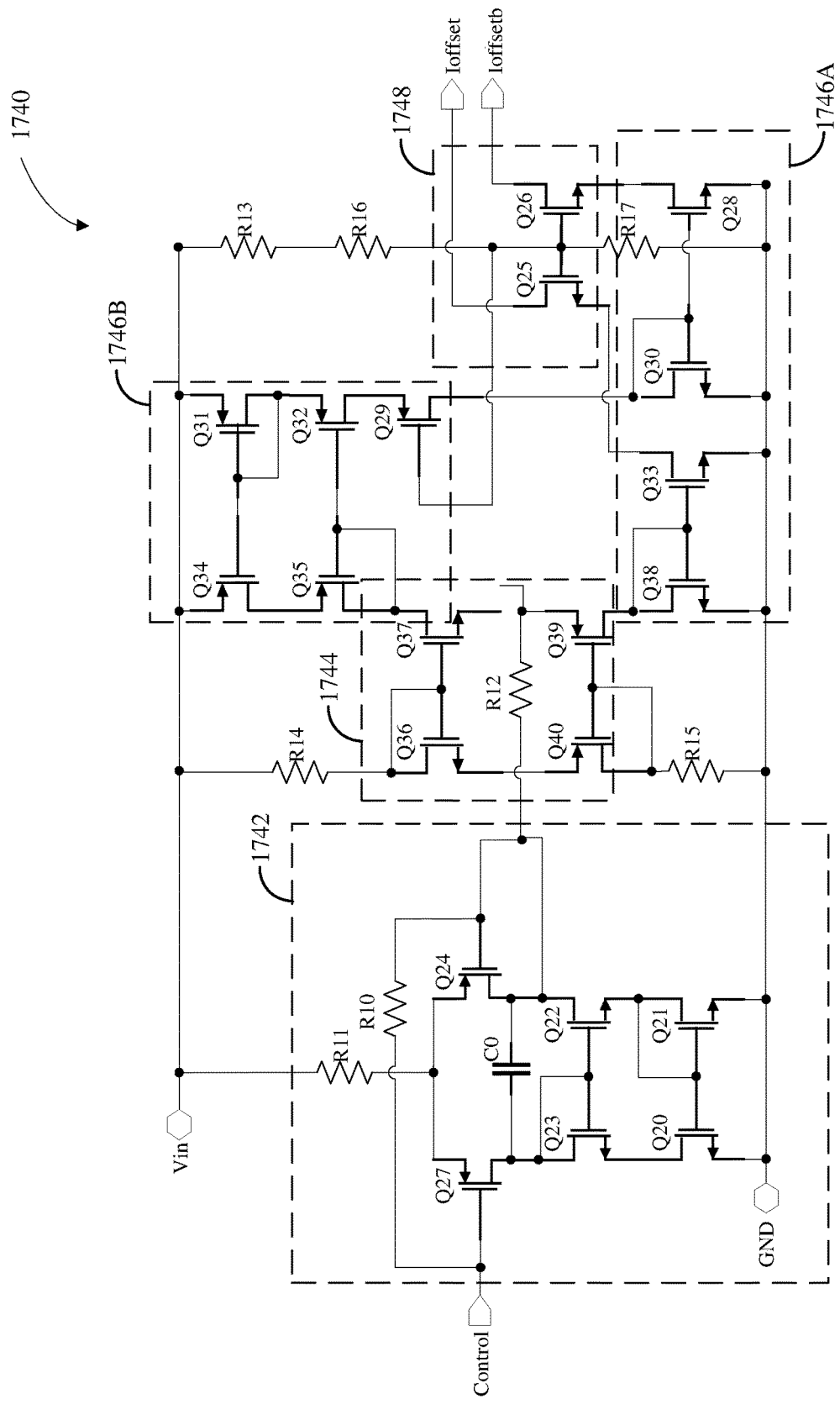
FIG. 17 is a schematic diagram of an offset control that could be used in the modulator device or apparatus of FIG. 16.

Various circuits may achieve the results indicated for the offset control 1540 above. One example is shown in FIG. 17, which is a schematic diagram of an offset control 1740 that could be used in the modulator device or apparatus 1600 of FIG. 16 as the offset control 1540. In general, the offset control 1740 includes an input buffer 1742, followed by a current steering circuit 1744 that is based on the direction of current in R12, by an N-channel mirror 1746A and a P-channel mirror 1746B, and a common gate output buffer 1748. Inputs include the positive supply voltage Vin (in an example 2.8 V), and Control, which controls the offset signals. In this example, Control controls the offset currents Ioffset and Ioffsetb) and is set by a digital to analog converter from the feedback circuit (such as DAC 1640 from feedback circuit 1550). The value for Control is set by the measured voltages VCOLP and VCOLN. While the offset control 1740 may use other switching devices such as bipolar transistors for switching, the example shown in FIG. 17 uses MOSFETs.

Figure 18:
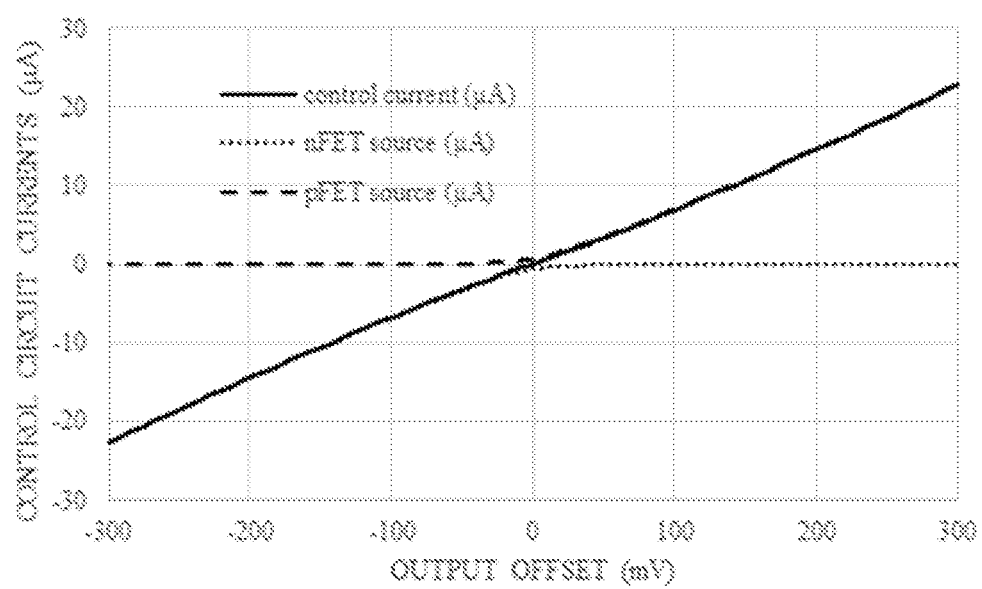
FIG. 18 is a graph of control currents of the offset control of FIG. 17 versus values for a voltage offset applied to the optical modulator.

In more detail, the offset control 1740 is typically fed by a control current IOOFS or a control voltage as discussed with regards to FIG. 16. Once passed through the input buffer 1742, the control current feeds the sources of an nFET Q37 and a pFET Q39, respectively, that belong to the current steering circuit 1744. The current steering circuit 1744 may be or include a class AB amplifier. The currents of the current steering circuit 1744 may be described with reference to the graph of FIG. 18. When the control current is 0 uA, both the nFET Q37 and the pFET Q39 are slightly turned on. When the control current is applied in the forward direction, the nFET Q37 is turned off and the pFET Q39 starts to conduct. Conversely, when the control current is applied in the reverse direction, the pFET Q39 is turned off and the nFET Q37 conducts. In FIG. 18, these currents—the control current, the nFET control current, and the pFET control current, are plotted against values for the voltage offset applied to the optical modulator 1520 (also referred to as the output offset). The output offset may be determined as the voltage difference (in mV) between $V_O^+$ and $V_O^-$ (e.g., $V_O^+ - V_O^-$) in some implementations.

The drains for each of the nFET Q37 and the pFET Q39 are connected to their respective gain current mirrors, namely the N-channel mirror 1746A and the P-channel mirror 1746B. For a control current in the positive direction, the drain of the pFET Q39 feeds into transistors Q38, Q33 of the N-channel mirror 1746A, and accordingly drives the output Ioffset through the transistor Q25. The drain of the nFET Q37 feeds into the transistors Q29, Q31, Q32, Q34, and Q35 of the P-channel mirror 1746B, which feeds transistors Q30 and Q28 of the N-channel mirror 1746A, which in turn drives the output Ioffsetb through the transistor Q26.

Figure 19:
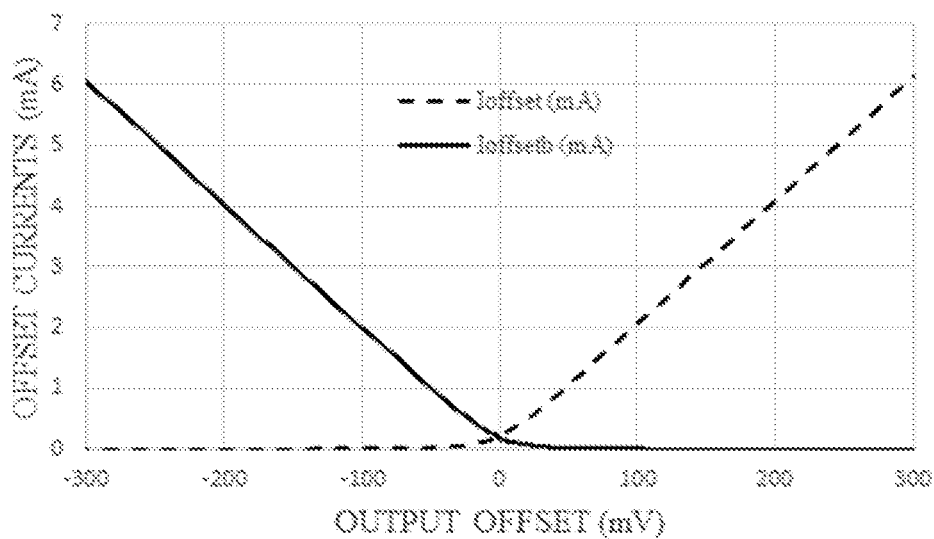
FIG. 19 is a graph of offset currents generated at the output of the offset control of FIG. 17 versus values for a voltage offset applied to the optical modulator.

At the common gate output buffer 1748, the gates of the transistors Q29, Q25, and Q26 are connected to a common d.c. bias point generated by the resistive divider R13, R16, and R17. That is, the transistors Q29, Q25, and Q26 are all common gate transistors used to isolate the drains of the transistors Q32, Q33, and Q28 from their respective loads. The outputs from the common gate output buffer 1748 correspond to the first offset signal (e.g., $I_{offset}$) and the second offset signal (e.g., $\overline{I_{offset}}$) in FIGS. 15 and 16. FIG. 19 is a graph of these offset currents generated at the output of the offset control 1740. They are plotted against values for the voltage offset (e.g., the output offset $V_O^+ - V_O^-$) applied to the optical modulator 1520.

Figure 20:
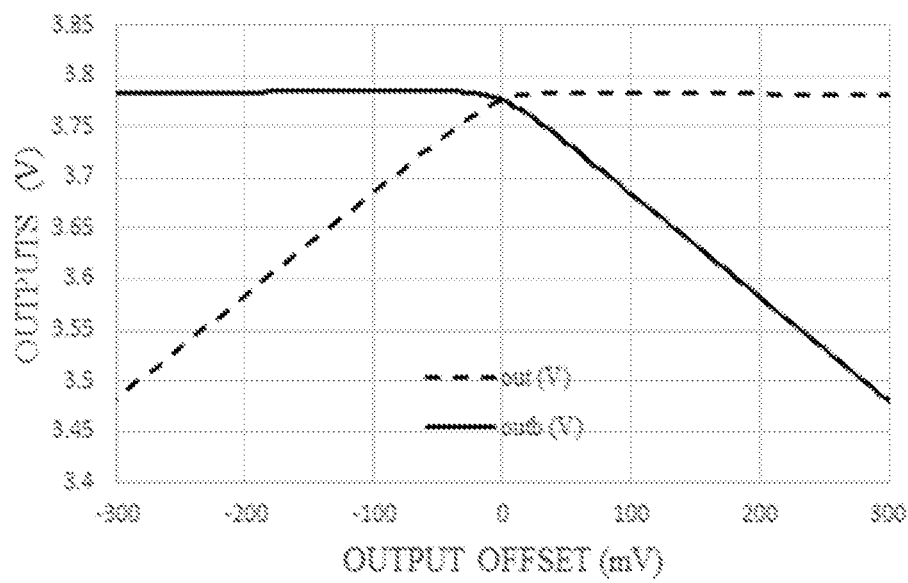
FIG. 20 is a graph of offset voltages at the output of the linear modulator driver of FIG. 16 versus values for a voltage offset applied to the optical modulator.

FIG. 20 is a graph of offset voltages at the output of the linear modulator driver 1620 of FIG. 16 versus values for a voltage offset (e.g., the output offset $V_O^+ - V_O^-$) applied to the optical modulator 1520. This demonstrates the behavior of the linear modulator driver 1620 at the outputs $V_O^+$ (out) and $V_O^-$ (outb) with the two offset signals (e.g., offset currents $I_{offset}$ and $I_{offsetb}$) input from the offset control 1540.

Referring back to FIG. 15, the optional feedback circuit 1550 is described above. The feedback circuit 1550 may be used in conjunction with the other optional feedback mechanism or circuit that comprises the receiver 1560 and the supervisory channel 1570. To distinguish the latter feedback circuit, it may be referred to as an optical modulator feedback circuit. In general, the optical modulator feedback circuit feeds back a signal based on the output of the optical modulator 1520 as input to the offset control 1540 for modifying the first offset signal and the second offset signal. More specifically, the optical modulator feedback circuit may receive an output of the optical modulator, determine a performance measure of the optical modulator using the output, and transmit an input signal to the offset control circuit to modify the first offset signal and the second offset signal using the performance measure.

The output of the optical modulator 1520 may be a light output received by the receiver 1560, such as a receiver familiar to those skilled in the art. The receiver 1560 may determine the performance measure. For example, the performance measure may be an indication of the target phase modulation between the first optical waveguide arm and the second optical waveguide arm of the optical modulator 1520. The performance measure may be chirp in the output of the optical modulator 1520. The performance measure may be a transmitter dispersed system performance measure such as the signal-to-noise ratio (SNR), the required optical signal-to-noise ratio (ROSNR), and/or the implementation noise (IMN). The supervisory channel 1570 may use the performance measure to determine the input signal for the offset control 1540. For example, the input signal may be a new offset signal (e.g., an offset current) for input to the offset control 1540 at the DAC 1640 shown in FIG. 16.

The output of the linear modulator driver, more specifically, the voltage offset between the first output voltage $V_O^+$ and the second output voltage $V_O^-$ may be calibrated to minimize a difference between the target phase modulation and an actual phase modulation of the optical modulator. This compensates for the transmitter chirp. The two feedback circuits may be used for this purpose. That is, calibrating the voltage offset may include adjusting the control signal (e.g., IOOFS) to the offset control circuit 1540 that determines the first offset signal and the second offset signal until the first output voltage is equal to the second output voltage (e.g., such that VCOLN and VCOLP provided by the feedback circuit 1550 in FIG. 16 are equal). This corrects for any asymmetry in the p- and n-portions of the linear modulator driver 1510. Then, the output of the optical modulator 1520 is measured or otherwise determined that indicates the actual phase modulation (e.g., by the optical modulator feedback circuit). This output may correspond to the performance measure described previously. The voltage offset is calibrated (minimizing chirp) when the actual phase modulation (as indicated by the performance measure) is within a defined range about the target phase modulation. This may occur when, for example, the performance measure is below a defined maximum value, such as with a maximum chirp or a defined link budget.

In some implementations, these steps of adjusting the control signal to the offset control circuit 1540 and determining the output of the optical modulator 1520 may need to be repeated. For example, where there is an imbalance in the arms of the optical modulator 1520, the first adjustment of the control signal will not address that imbalance. Accordingly, calibrating the voltage offset may include, responsive to determining that the actual phase modulation is outside the defined range about the target phase modulation, repeating the adjusting and the measuring until the actual phase modulation is within the defined range about the target phase modulation. This process negates the overall driver and modulator imbalances, resulting in improved system performance and/or chirp.

Figure 21:
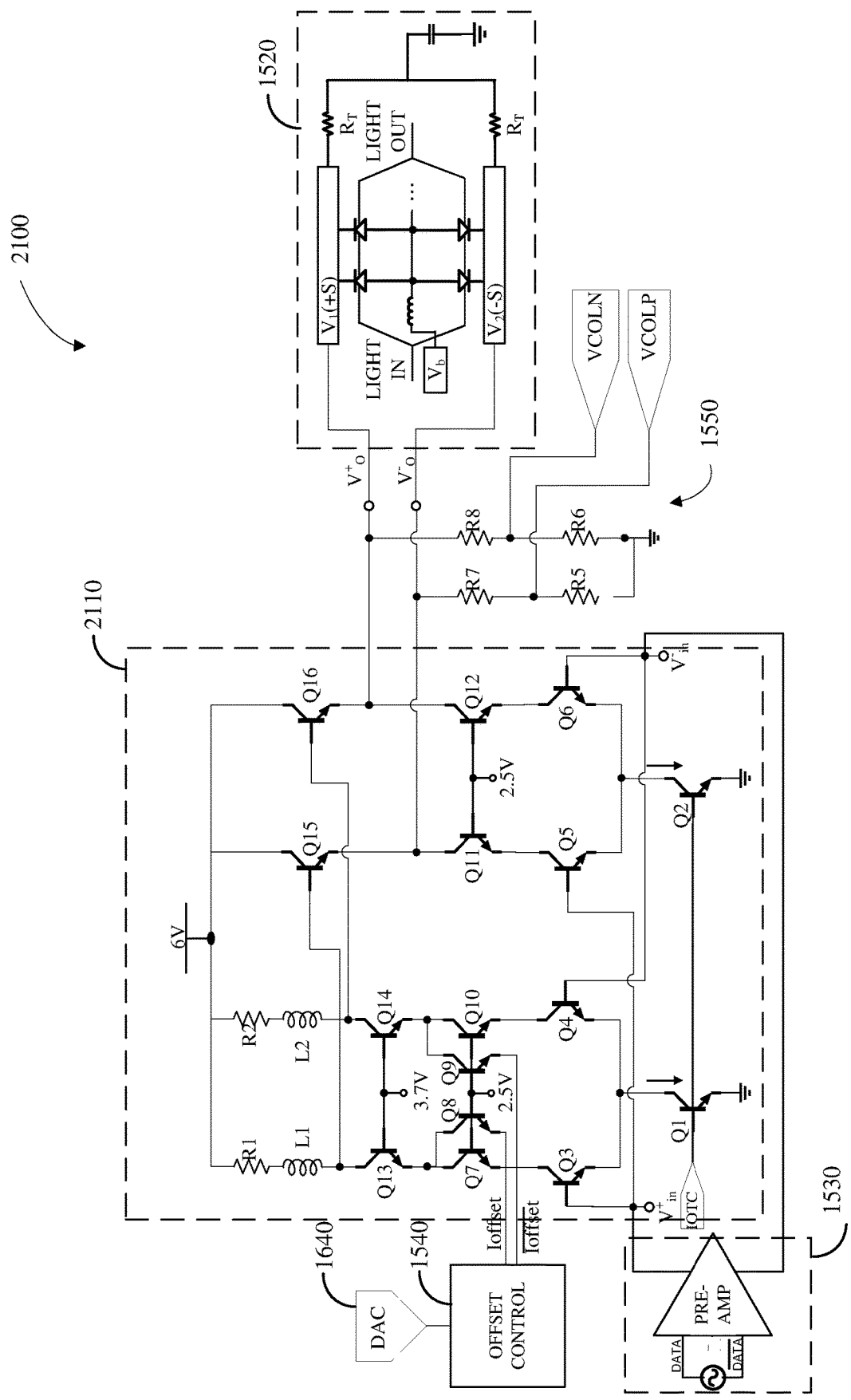
FIG. 21 is a schematic diagram illustrating an embodiment of a modulator device of the proposed solution using a nppn SPP configuration, driven by a single emitter follower push-pull differential driver.

Another variation of the optical modulator devices described herein is shown in FIG. 21. FIG. 21 is a schematic diagram illustrating an embodiment of a modulator device 2100 of the proposed solution using a nppn SPP configuration. This implementation of the optical modulator device 1500 is similar to the optical modulator device 1600. However, instead of a linear modulator driver 1610 comprising a dual series-stacked emitter follower push-pull differential driver, the linear modulator driver 1710 comprises a single emitter follower push-pull differential driver. In this variation, the MOS transistors in the current sources and lower part of the left/right cascode are changed to HBT. This architecture may also be referred to as a Single Emitter Follower Push-Pull (SEFPP). The offset control 1540 may comprise the offset control circuit of FIG. 17. A detailed operation of this driver is omitted as it is cumulative to the description of the operation of the driver of FIG. 16.

The apparatuses, circuits, and methods described herein are broadly applicable to lumped and distributed driver and optical modulator element applications, applying equally to SPP applications utilizing a pnnp configuration, for example. These apparatuses, circuits, and methods can be applied to reverse biased pn junctions, as well as to pn junctions in forward conduction. The apparatuses, circuits, and methods are applicable to optical modulators utilizing multiple sections, each section being driven individually by its own driver. Each section could be driven with the same signal shifted in time or using different signals, as in an optical DAC (with each section driven by the signal corresponding to one bit of the modulation format), for example.

The proposed apparatuses, circuits, and methods improve the robustness of an optical modulator to mask misalignment during its manufacture by providing independent bias to each pn junction, while at the same time enabling maximum power/electrical swing being delivered to the optical modulator. Advantageously, the apparatuses, circuits, and methods consume less power and may be more compact than alternative schemes.

An alternative, conventional linear drivers for high-order n-QAM/OFDM coherent and high-order PAM-n/DMT intensity modulation systems and carrier-less amplitude phase modulation (CAP-n) systems intentionally attempt to have the same common mode voltage or collector current traveling in both output complements transistors Q1 and Q2 in order to minimize even order harmonic distortion. As the result of this architecture, a common bias $V_1$ and $V_2$ on the two MZ modulator arms +S and −S is provided, where $V_1=V_2=V_{dd}-I_{DC}R_T$. This is applicable to both open collector and back-terminated drivers, for example. The shortcoming of this solution is that it does not address MZ modulator arm mismatch or resistor mismatch, as discussed herein above.

To address this shortcoming, it is possible to independently bias the pn junctions in the two MZ modulator arms by using a driver (either open collector/drain or back-terminated) that is supplied with two different voltages that can be independently adjusted to address the MZ modulator imbalance and termination resistor RT inequalities. However, this configuration is disadvantageous. Although it does solve the MZ modulator imbalance with two separate supplies Vsp and Vsn, it is very complex to implement because it requires two independent voltage regulators, increasing the complexity in highly-integrated and compact solutions.

It is further possible to AC-couple the driver (either open collector/drain or back-terminated) to the MZ modulator. Again, the driver is supplied with two different voltages that can be independently adjusted to solve the MZ modulator imbalance and termination resistor $R_T$ inequalities. Again, this configuration is disadvantageous. While it does solve the MZ modulator imbalance with two separate supplies, the driver current $I_{DC}$ is isolated to inductors, thus eliminating the current requirements on the two independent MZ modulator bias supplies. This is very complex to manufacture because it requires the addition of bias tees and DC blocks to isolate the DC common mode of the driver from the MZ modulator bias, thus increasing the complexity in highly-integrated and compact packaging solutions and moreover increasing RF losses.

The above alternative solutions either do not provide a solution to MZ modulator or termination resistor imbalance, and in configurations where they do provide an imbalance solution, they are complex in terms of packaging and implementation, whereby additional DACs and regulators are required to provide independent bias and bias tees and DC blocks to distinguish the driver output common mode voltage from the MZ modulator bias. This prohibits use in compact highly-integrated packages, such as Coherent Optical Sub-Assemblies (COSAs) and Integrated Coherent Transmitter-Receiver Optical Sub-Assemblies (IC-TROSAs).

Another alternative solution is to use the driver topology presented in the paper identified above. In order to use the push-pull amplifier with an external biasing circuit, the interface between the output of the driver and the optical modulator arms requires DC blocks (AC coupling), to isolate the DC common mode of the output from the optical modulator bias. The optical modulator is supplied with two different voltages Vsp and Vsn, so that they can be independently adjusted to solve the modulator imbalance. This configuration is also disadvantageous. Although it solves the modulator imbalance with two separate supplies Vsp and Vsn, this solution incurs higher RF losses due to the introduction of DC blocks and requires two independent voltage regulators or DACs, thus increasing the complexity in highly integrated and compact solutions.

All embodiments of the proposed solution are based on controlling the DC offset of the driver output complements, resulting in modulator pairs that have the same efficiency, thereby sufficiently negating manufacturing error and resultant modulator chirp. In the transmitter section of a COSA, for example, RF imbalance is one important parameter of the modulator, such as one required for QPSK modulation. One cause of RF imbalance is the unequal phase modulation efficiency in the two arms of the optical modulator. The proposed solution minimizes the RF imbalance of modulators and increases the manufacturing yield, improving transmitter performance to meet a chirp parameter <±0.05, for example, while providing a compact solution as optical modems evolve to being highly integrated and compact for inclusion into pluggables and optics-on-board (OBO) solutions. It should be noted that the devices and methods of the proposed solution are not limited to SiP-based technologies, but could also benefit InP-based modulators and the like as they would also have some manufacturing errors, even if to a smaller degree.

As used herein, the terminology "computer" or "computing device" includes any unit, or combination of units, capable of performing any method, or any portion or portions thereof, disclosed herein. The computer or computing device may include a processor.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. An apparatus, comprising:
an optical modulator control circuit configured to generate a first input voltage and a second input voltage, the first input voltage and the second input voltage determined to produce a target phase modulation between a first optical waveguide arm and a second optical waveguide arm of an optical modulator;
an offset control circuit configured to generate a first offset signal and a second offset signal based on the first input voltage and the second input voltage; and
a linear modulator driver configured to
receive the first offset signal and the second offset signal;
generate, using the first offset signal, a first output voltage for biasing the first optical waveguide arm; and
generate, using the second offset signal, a second output voltage for biasing the second optical waveguide arm, wherein at least one of the first output voltage is different from the first input voltage or the second output voltage is different from the second input voltage.

2. The apparatus of claim 1, wherein
the first offset signal is a first offset current and the second offset signal is a second offset current, and
the linear modulator driver is configured to
receive the first input voltage and the second input voltage;
generate the first output voltage for biasing the first optical waveguide arm by modifying the first input voltage using the first offset current; and
generate the second output voltage for biasing the second optical waveguide arm by modifying the second input voltage using the second offset current.

3. The apparatus of claim 1, further comprising
a feedback circuit configured to feed the first output voltage and the second output voltage to the offset control circuit, wherein the offset control circuit is configured to generate the first offset signal and the second offset signal using the first output voltage and the second output voltage.

4. The apparatus of claim 1, wherein the target phase modulation represents a condition wherein the first optical waveguide arm and the second optical waveguide arm exhibit one of a same phase modulation or a defined different phase modulation.

5. The apparatus of claim 1, further comprising
the optical modulator, the optical modulator comprising a first electrode coupled to the first optical waveguide arm, and a second electrode coupled to the second optical waveguide arm, wherein the linear modulator driver is coupled to each of the first electrode and the second electrode for respectively applying the first output voltage at the first electrode and the second output voltage at the second electrode.

6. The apparatus of claim 1, wherein the optical modulator is a Mach-Zehnder modulator in a series push-pull configuration.

7. The apparatus of claim 1, further comprising
an optical modulator feedback circuit that receives an output of the optical modulator and transmits an input signal to the offset control circuit to modify the first offset signal and the second offset signal.

8. The apparatus of claim 1, wherein the first offset signal and the second offset signal are determined to compensate for one or more of a manufacturing error in the first optical waveguide arm, a manufacturing error in the second optical waveguide arm, a manufacturing error in one or more resistor elements of the linear modulator driver, or a manufacturing error in one or more switching devices of the linear modulator driver.

9. The apparatus of claim 1, wherein
the first offset signal comprises a first offset current and the second offset signal comprises a second offset current,
the linear modulator driver comprises a differential push-pull driver with an output stage including a single emitter follower or a dual series-stacked emitter follower receiving a DC offset current corresponding to the first offset signal and the second offset signal.

10. An apparatus, comprising:
an optical modulator control circuit configured to generate a first input voltage and a second input voltage, the first input voltage and the second input voltage determined to produce a target phase modulation between a first optical waveguide arm and a second optical waveguide arm of an optical modulator;
an offset control circuit configured to generate a first offset current and a second offset current;
a linear modulator driver configured to receive the first input voltage, the second input voltage, the first offset current, and the second offset current, and to generate a first output voltage for biasing the first optical waveguide arm by modifying the first input voltage using the first offset current and to generate a second output voltage for biasing the second optical waveguide arm by modifying the second input voltage using the second offset current, wherein at least one of the first output voltage is different from the first input voltage or the second output voltage is different from the second input voltage.

11. The apparatus of claim 10, further comprising
a feedback circuit configured to feed the first output voltage and the second output voltage to the offset control circuit, wherein the offset control circuit is configured to generate the first offset current and the second offset current using the first output voltage and the second output voltage.

12. The apparatus of claim 10, further comprising
the optical modulator, the optical modulator comprising a Mach-Zehnder (MZ) modulator in a series push-pull configuration, wherein the linear modulator driver is coupled to a first electrode and a second electrode of the MZ modulator to apply the first output voltage to the first electrode and apply the second output voltage to the second electrode.

13. The apparatus of claim 10, further comprising
an optical modulator feedback circuit that receives an output of the optical modulator, determines a performance measure of the optical modulator using the output, and transmits an input signal to the offset control circuit to modify the first offset current and the second offset current using the performance measure.

14. A method, comprising:

receiving, from an optical modulator control circuit, a first input voltage and a second input voltage, wherein the first input voltage and the second input voltage are determined to produce a target phase modulation between a first optical waveguide arm and a second optical waveguide arm of an optical modulator;

generating, using an offset control circuit, a first offset signal and a second offset signal based on the first input voltage and the second input voltage;

receiving, at a linear modulator driver, the first offset signal and the second offset signal; and generating, using the linear modulator driver, a first output voltage for biasing the first optical waveguide arm using the first offset signal, and a second output voltage for biasing the second optical waveguide arm using the second offset signal, wherein at least one of the first output voltage is different from the first input voltage and the second output voltage is different from the second input voltage.

15. The method of claim 14, further comprising calibrating a voltage offset between the first output voltage and the second output voltage to minimize a difference between the target phase modulation and an actual phase modulation of the optical modulator.

16. The method of claim 15, wherein calibrating the voltage offset comprises adjusting a control signal to the offset control circuit that determines the first offset signal and the second offset signal until the first output voltage is equal to the second output voltage; and determining an output of the optical modulator that indicates the actual phase modulation, wherein the voltage offset is calibrated when the actual phase modulation is within a defined range about the target phase modulation.

17. The method of claim 16, wherein calibrating the voltage offset comprises responsive to determining that the actual phase modulation is outside the defined range about the target phase modulation, repeating the adjusting and the measuring until the actual phase modulation is within the defined range about the target phase modulation.

18. The method of claim 14, further comprising receiving, by a feedback circuit, the first output voltage and the second output voltage at the offset control circuit, wherein generating the first offset signal and the second offset signal comprising generating a first current offset and a second current offset using the first output voltage and the second output voltage.

19. The method of claim 14, wherein the first offset signal is a first offset current and the second offset signal is a second offset current, and the method further comprises receiving, at the linear modulator driver, the first input voltage and the second input voltage;

generating the first output voltage for biasing the first optical waveguide arm comprises modifying the first input voltage using the first offset current;

generating the second output voltage for biasing the second optical waveguide arm comprises modifying the second input voltage using the second offset current;

feeding, using feedback circuitry, the first output voltage and the second output voltage to the offset control circuit;

generating the first offset signal comprises generating the first offset current using the first output voltage and the first input voltage; and generating the second offset signal comprises generating the second offset current using the second output voltage and the second input voltage.

20. The method of claim 14, wherein the linear modulator driver is coupled to each of a first electrode and a second electrode of the optical modulator, and the method further comprises applying the first output voltage to the first electrode; and applying the second output voltage to the second electrode, wherein the first electrode is coupled to the first optical waveguide arm and the second electrode is coupled to the second optical waveguide arm.

\* \* \* \* \*